United States Patent
Kang et al.

(10) Patent No.: US 11,351,518 B2
(45) Date of Patent: Jun. 7, 2022

(54) CESIUM ADSORBENT AND METHOD OF PREPARING THE SAME

(71) Applicant: KOREA INSTITUTE OF CIVIL ENGINEERING AND BUILDING TECHNOLOGY, Goyang-si (KR)

(72) Inventors: Sung Won Kang, Seoul (KR); Young Sug Kim, Goyang-si (KR); Yoon Suhn Chung, Jecheon-si (KR); Dae Min Oh, Suwon-si (KR); Bok Seong Kim, Seoul (KR); Sol Kim, Yangju-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 329 days.

(21) Appl. No.: 16/548,085

(22) Filed: Aug. 22, 2019

(65) Prior Publication Data

US 2020/0061577 A1   Feb. 27, 2020

(30) Foreign Application Priority Data

Aug. 24, 2018 (KR) .................. 10-2018-0099120
Aug. 24, 2018 (KR) .................. 10-2018-0099122
Aug. 24, 2018 (KR) .................. 10-2018-0099123

(51) Int. Cl.
| | | |
|---|---|---|
| *C02F 1/28* | (2006.01) | |
| *B01J 20/00* | (2006.01) | |
| *B01J 20/22* | (2006.01) | |
| *G21F 9/12* | (2006.01) | |
| *B01J 20/26* | (2006.01) | |
| *B01J 20/24* | (2006.01) | |
| *B01J 20/12* | (2006.01) | |
| *B01J 20/28* | (2006.01) | |
| *B01J 20/32* | (2006.01) | |
| *B01J 20/20* | (2006.01) | |

(52) U.S. Cl.
CPC .............. *B01J 20/223* (2013.01); *B01J 20/12* (2013.01); *B01J 20/20* (2013.01); *B01J 20/24* (2013.01); *B01J 20/265* (2013.01); *B01J 20/28045* (2013.01); *B01J 20/321* (2013.01); *B01J 20/3204* (2013.01); *B01J 20/3212* (2013.01); *B01J 20/3219* (2013.01); *B01J 20/3265* (2013.01); *G21F 9/12* (2013.01)

(58) Field of Classification Search
CPC .... B01J 20/28; B01J 20/2803; B01J 20/3042; B01J 20/32; B01J 20/3202; B01J 20/3206; B01J 20/3208; C02F 1/58; B01D 2257/60
See application file for complete search history.

(56) References Cited

FOREIGN PATENT DOCUMENTS

| JP | 2013-150973 A | | 8/2013 |
|---|---|---|---|
| JP | 2014065846 A | * | 4/2014 |
| JP | 2015-099139 A | | 5/2015 |
| JP | 2017-090373 A | | 5/2017 |
| KR | 1708708 B1 | * | 2/2017 |
| KR | 10-2017-0052254 A | | 5/2017 |

OTHER PUBLICATIONS

KR101708708B1 translation (Year: 2017).*
Synthesis and Characterisation of Carboxymethyl Cellulose From Various Agricultural Wastes, Huang et al., Cellulose Chem. Technol., 51 (7-8), 665-672 (2017). (Year: 2017).*
Korean Office Action for related KR Application No. 10-2018-0099120 dated Jan. 30, 2020 from Korean Intellectual Property Office.
Korean Notice of Allowance for related KR Application No. 10-2018-0099120 dated Jul. 14, 2020 from Korean Intellectual Property Office.
Korean Office Action for related KR Application No. 10-2018-0099122 dated Jan. 30, 2020 from Korean Intellectual Property Office.
Korean Notice of Allowance for related KR Application No. 10-2018-0099122 dated Aug. 10, 2020 from Korean Intellectual Property Office.
Korean Office Action for related KR Application No. 10-2018-0099123 dated Jan. 30, 2020 from Korean Intellectual Property Office.
Korean Notice of Allowance for related KR Application No. 10-2018-0099123 dated Jul. 14, 2020 from Korean Intellectual Property Office.
Hyowon Kim et al., "Development of Filter-Type Adsorbent Containing Prussian Blue for Adsorption of Cesium in Aqueous Phase", J. Korean Soc. Environ. Eng., Aug. 20, 2018, pp. 334-340, vol. 40, No. 8.
Shili Xiao et al., "Immobilization of Zerovalent Iron Nanoparticles into Electrospun Polymer Nanofibers: Synthesis, Characterization, and Potential Environmental Applications", J. Phys. Chem. C, Sep. 6, 2009, pp. 18062-18068, vol. 113, No. 42.
Paul D. Mines et al., "Covalent organic polymer functionalization of activated carbon surfaces through acyl chloride for environmental clean-up", Chemical Engineering Journal, Oct. 19, 2016, pp. 766-771, vol. 309, No. 1.

* cited by examiner

*Primary Examiner* — Haidung D Nguyen
(74) *Attorney, Agent, or Firm* — Paratus Law Group, PLLC

(57) ABSTRACT

Provided herein is a cesium adsorbent including: a support modified to have a carboxyl group on a surface thereof; and Prussian blue synthesized on the surface of the modified support, wherein the Prussian blue is at least partially chemically bound with the surface of the support. The cesium adsorbent may effectively adsorb cesium, which is a radioactive element released into the water and may be easily prepared using a simple solution process.

1 Claim, 19 Drawing Sheets

(g) LBL-PAA-PVA-PB (CROSS-SECTION)

(h) LBL-PAA-PVA-PB (SURFACE)

(k) LBL-PAA-Cellulose (AGGREGATE)

(i) LBL-PAA-Cellulose-PB (a)          (b)

CESIUM ADSORBENT AND METHOD OF PREPARING THE SAME

CROSS-REFERENCE TO PRIOR APPLICATIONS

This application claims priority to Korean Patent Application Nos. 10-2018-0099120 filed on Aug. 24, 2018, 10-2018-0099122 filed on Aug. 24, 2018, and 10-2018-0099123 filed on Aug. 24, 2018, which are all hereby incorporate by reference in their entirety.

ACKNOWLEDGEMENTS

This work was supported by Creative Allied Project funded by the Ministry of Science and ICT (MSIT, Republic of Korea; Project Name: Development of Water Security Technology for Radioactive Exposure Emergency Assistance-Especially for Rivers and Dams; Project Number: CAP-15-07-KICT).

BACKGROUND

The present disclosure relates to a technology related to water security for the first responses when exposed to radioactivity, and more particularly to a technology for preparing a cesium adsorbent capable of effectively adsorbing cesium, which is a radioactive element released into the water.

Since the Fukushima nuclear accident, there has been growing concern about the possibility of leakage of radioactive materials in nuclear power plants, nuclear weapon accidents, or when terrorist attacks occur. Due to the leakage of these radioactive materials, reservoirs, rivers, and the like may be polluted and in this case, secondary damage such as a problem with safe water supply, and the like may occur.

Specifically, radioactive materials such as cesium and the like cannot be decomposed or stabilized physically, chemically, and biologically, and thus the best method to primarily separate such radioactive materials is adsorption onto an adsorbent or the like, and the transfer and storage of the materials in a safe place.

Techniques for adsorbing and removing radioactive cesium using Prussian blue are disclosed in Korea Patent Application No. 2015-0154486 filed on Nov. 4, 2015 (Patent Application Publication No. 10-2017-0052254 published on May 12, 2017), and the like. Prussian blue is known to selectively adsorb and remove cesium due to a lattice structure thereof, but has a problem with separation after treatment due to the size of about several tens of nanometers. To address these problems, the use of various supports such as a composite formed through binding with magnetic nanoparticles, and the like as adsorbents has been tried, but most of the adsorbents merely physically bind to Prussian blue and have difficulty in being used in water.

SUMMARY

The present disclosure has been made to address the above-described problems of the related art, and an embodiment of the present disclosure provides a cesium adsorbent that is capable of effectively adsorbing cesium, which is a radioactive element released into the water, and is easily mass-produced.

Additional aspects will be set forth in part in the description which follows and, in part, will be apparent from the description, or may be learned by practice of the presented embodiments.

According to an aspect of an embodiment, a cesium adsorbent includes: a support modified to have a carboxyl group on a surface thereof; and Prussian blue synthesized on the surface of the modified support, wherein the Prussian blue is at least partially chemically bound with the surface of the support.

The support may be a polymer material having a hydroxyl group, and the carboxyl group may be formed by treating the polymer material with acrylic acid. The polymer material may include a PVA sponge or cellulose.

The support may include illite, and the carboxyl group may be formed by treating a surface of the illite with acrylic acid.

The support may include powdered activated carbon. The powdered activated carbon may include a carboxyl group formed by oxidizing a surface thereof, wherein a covalent organic polymer is bound to the surface. The covalent organic polymer may include melamine.

According to an aspect of another embodiment, a method of preparing a cesium adsorbent includes: forming a carboxyl group on a surface of a support; and directly synthesizing Prussian blue on the surface of the support with the carboxyl group formed thereon.

When a polymer having a hydroxyl group is used as the support, the method may include: modifying a surface of the polymer to have a carboxyl group thereon by treating the polymer with acrylic acid; adding a sodium chloride (NaCl) solution to the polymer to allow a reaction to occur therebetween; adding an iron chloride ($FeCl_3$) solution to the polymer to allow a reaction to occur therebetween; adding a potassium ferrocyanide ($K_4Fe(CN)_6$) solution to the polymer to allow a reaction to occur therebetween; and further adding the iron chloride ($FeCl_3$) solution to the polymer.

When illite is used as the support, the method may include: modifying a surface of the illite to have a carboxyl group thereon by treating the illite with acrylic acid; adding a sodium chloride (NaCl) solution to the illite to allow a reaction to occur therebetween; adding an iron chloride ($FeCl_3$) solution to the illite to allow a reaction to occur therebetween; adding a potassium ferrocyanide ($K_4Fe(CN)_6$) solution to the illite to allow a reaction to occur therebetween; and further adding the iron chloride ($FeCl_3$) solution to the illite.

When powered activated carbon is used as the support, the method may include: modifying a surface of the powered activated carbon to have a carboxyl group thereon by oxidizing the powered activated carbon; forming an acyl chloride group on the surface of the oxidized activated carbon by reacting the oxidized activated carbon with thionyl chloride; preparing polymer-modified powdered activated carbon by grafting the oxidized activated carbon with a polymer; growing the polymer on the surface of the polymer-modified powdered activated carbon; and in-situ reacting the powdered activated carbon with an iron (III) chloride solution and a potassium ferrocyanide solution.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
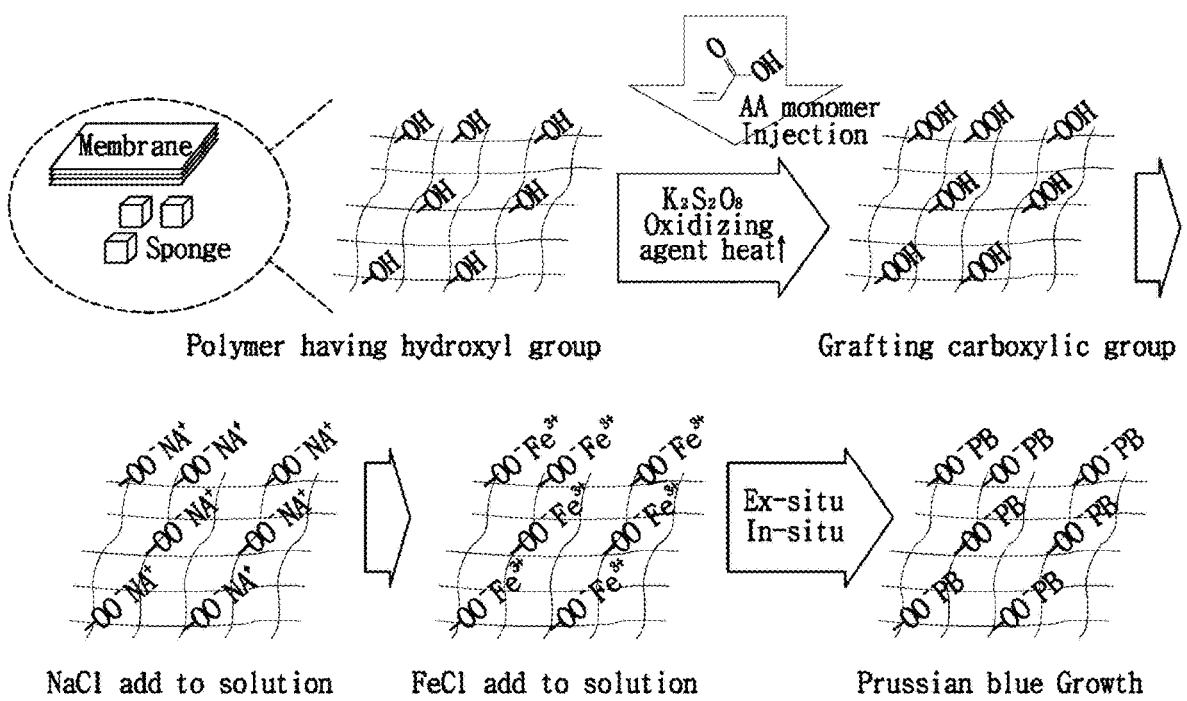
FIG. 1 illustrates a series of processes of surface-modifying PVA and cellulose supports with acrylic acid and binding Prussian blue thereto.

Hereinafter, a cesium adsorbent and a method of preparing the same, according to the present disclosure, will be described in detail with reference to the accompanying drawings, examples, experiments, and the like. However, the following descriptions are provided for illustrative purposes to aid in understanding of the present disclosure and are not intended to limit the technical spirit of the present disclosure. The technical spirit of the present disclosure may be interpreted or limited only by the following claims.

The cesium adsorbent includes a modified support and Prussian blue synthesized on a surface of the support. In an embodiment of the present disclosure, the support may include a polymer, powdered illite, or powdered activated carbon.

Hereinafter, a cesium adsorbent including each support and a method of preparing each cesium adsorbent will be described in detail.

[Polymer Support]

A method of preparing a cesium adsorbent including a polymer as the support includes: modifying a surface of a polymer by treating the polymer with acrylic acid so that the surface of the polymer contains a carboxyl group, wherein the polymer has a hydroxyl group (—OH); adding a sodium chloride (NaCl) solution to the polymer to allow a reaction to occur therebetween; adding an iron chloride ($FeCl_3$) solution to the polymer to allow a reaction to occur therebetween; adding a potassium ferrocyanide ($K_4Fe(CN)_6$) solution to the polymer to allow a reaction to occur therebetween; and further adding the iron chloride ($FeCl_3$) solution to the polymer.

The concentration of the solution used in each process is as follows. The concentration of the acrylic acid ranges from about 0.3 M to about 3.0 M, the concentration of the sodium chloride (NaCl) solution ranges from about 0.05 M to about 0.2 M, the concentration of the iron chloride ($FeCl_3$) solution ranges from about 5 mM to about 100 mM, the concentration of the potassium ferrocyanide ($K_4Fe(CN)_6$) solution ranges from about 5 mM to about 100 mM, and the concentration of the iron chloride ($FeCl_3$) solution ranges from 2.5 mM to about 50 mM.

As the polymer, a polyvinyl alcohol (PVA) sponge having a hydroxyl group, a cellulose nonwoven fabric having a hydroxyl group, or the like may be used.

The surface modification method is for converting —OH, which is a hydrophilic group present in porous pores of the PVA sponge or the cellulose nonwoven fabric, into a carboxyl group by using a grafting method using potassium persulfate and acrylic acid so that the surface of the support contains the carboxyl group. When a negative charge (—COO⁻) is generated on the carboxyl group-modified surface, binding strength thereof with Prussian blue is increased and the growth of Prussian blue (PB) on the surface of the adsorbent material may be facilitated by layer-by-layer assembly.

PB immobilization is determined by the unshared electron pair of the oxygen moiety of the hydroxyl group present on the surface of the PVA sponge or the cellulose nonwoven fabric. PB has a strong attraction to water and weak immobilization with a hydroxyl group, and thus is easily released by washing after adsorption. Meanwhile, when the hydroxyl group of the PVA sponge or the cellulose nonwoven fabric was converted into a carboxyl group through modification by acrylic acid, binding between the negative charge present on the surface of the support and PB was stably formed, thereby suppressing the release of PB by washing. In addition, by the acrylic acid modification, a porous polymer structure of polyacrylic acid was formed in the pores of the PVA sponge and the cellulose nonwoven fabric material, and water is able to freely permeate into and out of the porous polymer structure, and thus cesium present in an ionic form was effectively reacted with internal PB.

When the PVA sponge or the cellulose nonwoven fabric material was modified with acrylic acid, it was observed that as the amount of acrylic acid (AA) injected was increased, the AA crosslinking component was located in the pores and the weight of the support was increased. However, it was observed that, when pores were blocked by a large amount of the crosslinking component, the transfer of iron ions into inner pores was impossible, and thus the iron adsorption equivalent was reduced, and an optimum injection amount of acrylic acid during modification was determined.

In addition, the stability of Prussian blue was enhanced by layer-by-layer (LBL) method. The existing Prussian blue in-situ method is generally performed by reacting trivalent iron ($Fe'$) with ferrocyanide ions ($[Fe\ (CN)_6]^{++}$). However, in this case, the balance in concentration between the attached trivalent iron and the added ferrocyanide ions may not be maintained, and in this case, a stable crystal cannot be formed due to the lack of trivalent iron. Therefore, after the above synthesis method, trivalent iron may be further added to thereby form a PB crystal by binding between iron ions and ferrocyanide ions that have not yet been bound to the iron, resulting in formation of stable PB.

Hereinafter, a method of preparing an adsorbent using a polymer as the support will be described in further detail with reference to specific embodiments, experiments, and the like.

Example 1: PVA Surface Modification

The surface modification of an immobilization supporting material for Prussian blue (PB) immobilization was set up as follows. A polymer solution for surface modification was prepared by mixing 0.600 g of potassium persulfate ($K_2S_2O_8$), 2.5 ml, 5 ml, 7.5 ml, 10 ml, or 12.5 ml of an acrylic acid ($CH_2CHCOOH$) solution, and 60 ml of deionized water. Subsequently, 0.250 g of a PVA sponge having a size of 0.5×0.5×0.5 $cm^3$ was immersed in the polymer solution, and the surface modification was carried out at 70° C. for about 6 hours by using a vacuum oven into which nitrogen was injected. After modification, impurities were removed from the modified material by using ethanol and deionized water, and moisture was completely removed therefrom at 60° C. to thereby complete the AA surface modification. The surface-modified material was named PAA-PVA (see FIG. 1).

Example 2: Surface Modification of Cellulose Nonwoven Fabric

The surface modification induction of a cellulose nonwoven fabric material was set as follows. A polymer solution was prepared by mixing 0.600 g of potassium persulfate ($K_{2S2O8}$), 1 ml, 2 ml, 4 ml, 6 ml, or 8 ml of acrylic acid ($CH_2CHCOOH$), and 20 ml of deionized water. Subsequently, upper and lower glass plates (23×23×0.5 $cm^3$) were prepared, and then cellulose was fixed to the lower glass plate and the polymer solution was added thereto to allow the polymer solution to permeate into the supporting material. Thereafter, the resulting structure was placed in a vacuum oven, and then nitrogen was injected into the vacuum oven to remove dissolved oxygen in the solution, and the surface modification was performed at 70° C. for about 6 hours. After modification, impurities were removed therefrom by using ethanol and deionized water, and moisture was completely removed therefrom in the oven at 60° C. to thereby complete the AA surface modification. The surface-modified material was named PAA-CF (see FIG. 1).

Experiment: Polymer Support

Optimization of the Surface Modification and Evaluation of Effect Thereof

To find the optimal AA injection concentration for the surface modification of a PVA sponge and a cellulose nonwoven fabric material using acrylic acid (AA), the adsorption equivalent of iron ions was evaluated in the present experiment. The synthesis of Prussian blue (PB), which will be described below, is performed through binding between trivalent iron ions and ferrocyanide ions, and thus it can be anticipated that when a large amount of trivalent iron ions are attached, PB may be synthesized in a large amount. In the present experiment, during the surface modification and synthesis, the AA injection amount was 2.5 ml, 5.0 ml, 7.5 ml, 10.0 ml, and 12.5 ml to synthesize PVA, and the AA injection amount was 1 ml, 2 ml, 4 ml, 6 ml, and 8 ml to prepare cellulose. 0.250 g of each of the prepared immobilization supports (PAA-PVA and PAA-CF) was weighed and was added to 50 ml (reaction volume) of a polymer solution at an iron concentration of about 1,000 ppm to perform an adsorption experiment. Thereafter, the residual concentration was analyzed using ICP-MS (Perkin-Elmer, USA), and $Fe'$ adsorption equivalents according to AA injection amount were calculated. In addition, the weight of each support prepared after the AA surface modification was measured, and the weights thereof before/after the AA surface modification were observed to measure the amount of AA produced.

Example 3: Formation of PB

For surface anion formation, support materials (PVA, cellulose, PAA-PVA, and PAA-CF) prior to PB synthesis were immersed in 50 ml of a 0.1 M sodium chloride (NaCl) solution to allow a reaction to occur therebetween. The measured weights of all the materials were the same (0.250 g) and the reaction time was between about 20 minutes and about 30 minutes. All pre-treated materials were subjected to the in-situ (presence/absence of material separation), ex-situ, and layer-by-layer methods to form PB (see FIG. 1).

1. In-Situ Method

A method of synthesizing PB in the presence of a support was named an in-situ method. For an experiment, each material separated from the NaCl solution was allowed to sufficiently react in 50 ml of 20 mM $FeCl_3$ for about 1 day such that $Fe'$ ions were adsorbed onto a surface of the immobilization support. Subsequently, the supernatant was separated from the reaction-completed material, and then immersed again in 50 ml of a 20 mM $K_4Fe(CN)_6$ solution, thereby completing the formation of PB.

2. Ex-Situ Method

PB was first synthesized in the absence of a support, and a support was immersed in the synthesized PB to allow the PB to be immobilized thereon, and this method was named an ex-situ method. Before adding the support material, first, 25 ml of a 20 mM $FeCl_3$ solution and 50 ml of a 20 mM $K_4Fe(CN)_6$ solution were added to prepare a PB solution. Subsequently, 0.250 g of each material separated from the NaCl solution was measured and added to the PB solution to perform surface staining.

3. Layer-by-Layer (L. B. L) Assembly

Figure 2:
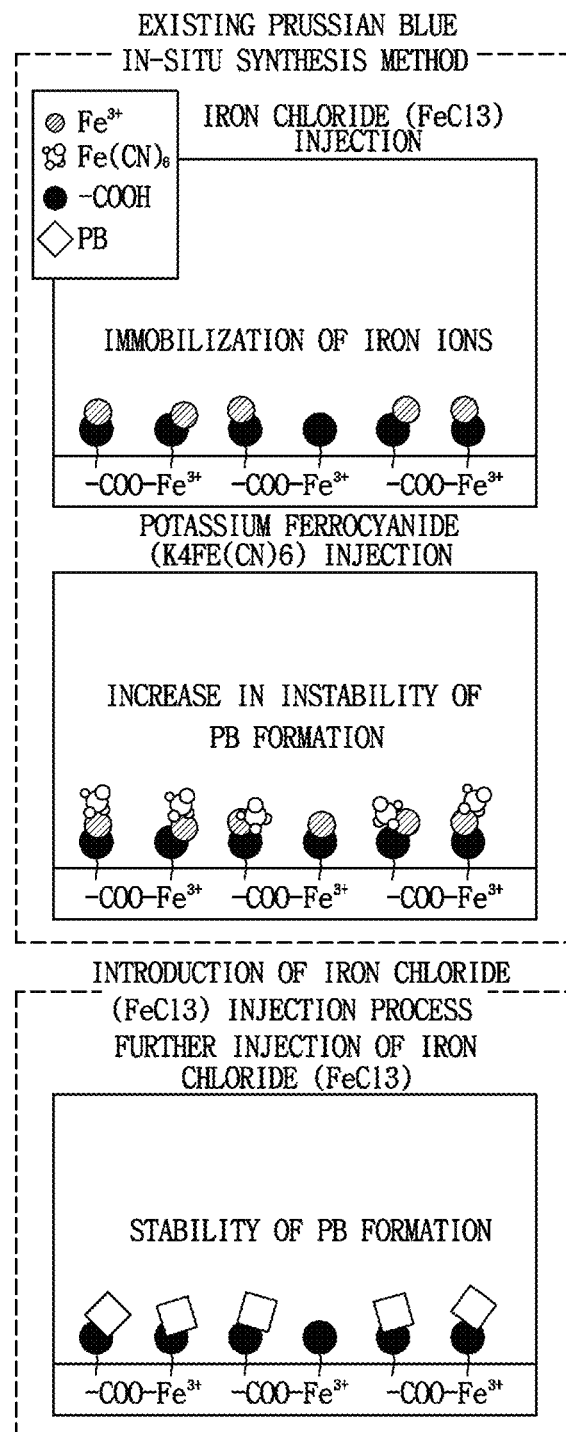
FIG. 2 illustrates a PVA layer-by-layer assembly method used to overcome the disadvantages of existing in-situ synthesis.

In the same manner as the in-situ method, 50 ml of a $FeCl_3$ solution was added to the material separated from the 0.1 M NaCl solution to immobilize iron ions thereon, and the material was separated again and 50 ml of a $K_4Fe(CN)_6$ solution was added thereto to thereby synthesize PB. However, since PB was unstably grown, the $FeCl_3$ solution was added again to the material to supply iron ions, thereby inducing the formation of stable PB (see FIG. 2). Subsequently, the resulting PB was completely dried to complete the preparation of a PB adsorbent material by LBL assembly. The concentrations of PB precursors added are shown in the following table. The aforementioned synthesis process is summarized in FIG. 2.

TABLE 1

Concentrations of Added PB Precursors of Modified/Unmodified Groups according to LBL Assembly

| Type of material | $FeCl_3$ injection concentration in first process (mM) | $K_4Fe(CN)_6$ injection concentration in second process (mM) | $FeCl_3$ injection concentration in third process (mM) | Each reaction volume (ml) |
|---|---|---|---|---|
| PVA | 20 | 20 | 10 | 50 |
| Cellulose | 20 | 20 | 5 | 50 |

Material Characterization

To evaluate the surface properties of materials and analyze constituent elements thereof, elements and contents of the synthesized materials were measured using a scanning electron microscope and X-ray spectroscopy (field emission scanning electron microscope, JEOL Ltd, Japan).

Adsorption Experiment Methods (Batch test/pH test/Isothermal test) As a cesium removal test method, a $^{133}Cs^+$ standard solution, which is a stable isotope having chemical properties similar to those of radioactive cesium ($^{137}Cs$), was diluted in ultrapure water to prepare a reference solution. For the batch test, a cesium adsorption test was carried out on 50 ml of 10 mg/L of cesium with respect to 0.100 g of an adsorbent material, and the experiment was performed for a reaction time period of 24 hours. After the adsorption test was completed, an isothermal adsorption test was performed on the resulting material and the experimental method was as follows. The adsorption experiment was carried out at a reaction volume of 50 ml in cesium adsorption concentration ranges of 0.2 mg/L, 0.5 mg/L, 2 mg/L, 5 mg/L, 10 mg/L, and 20 mg/L with respect to 0.100 g of an absorbent material, and the adsorption reaction proceeded for about 24 hours. Thereafter, for adsorption analysis, the concentration of residual cesium was analyzed using an inductively coupled plasma mass spectrometer (ICP-MS), and the adsorption equivalent of each material was analyzed using the concentration. Isothermal curves were analyzed using Langmuir and Freundlich models as isothermal adsorption models, and equations of the applied models are shown as follows:

TABLE 2

Freundlich & Langmuir adsorption models used in isothermal adsorption curves

| Model name | Equation | |
|---|---|---|
| Freundlich model | $C_s = K_f^* C_w^{\frac{1}{n}}$ | $C_s$ = concentration of cesium adsorbed on solid (μg/Kg)<br>$C_w$ = concentration of cesium remaining in solution (μg/L)<br>$K_f$ = Freundlich constant [(μg/kg)/(μg/L)$^n$]<br>n = adsorption strength (0 to 1) linear model if n =1 |
| Langmuir model | $\frac{1}{C_s} = \frac{1}{q_m} + \frac{1}{q_m K_L C_w}$ | $C_s$ = concentration of cesium adsorbed on solid (μg/Kg)<br>$C_w$ = concentration of cesium remaining in solution (μg/L)<br>$q_m$ = maximum adsorption amount of single adsorption surface (μg/Kg)<br>$K_L$ = Langmuir constant (L/μg) |

PB Elution Evaluation (UV-Spectrum)

To examine the degree of leakage of PB from a surface of an immobilization support material, the degree of elution of the synthesized PB from a surface-modified support during washing was analyzed using a UV-Vis spectrophotometer (Libara S22, BioChrom Ltd., USA). In addition, to examine the stability of PB in water from the decontamination material, analysis was performed using the same spectrophotometer to investigate PB leakage after physical impact and adsorption breakthrough.

Experimental Results: Polymer Support

1. AA Surface Modification Experimental Results

Figure 3:
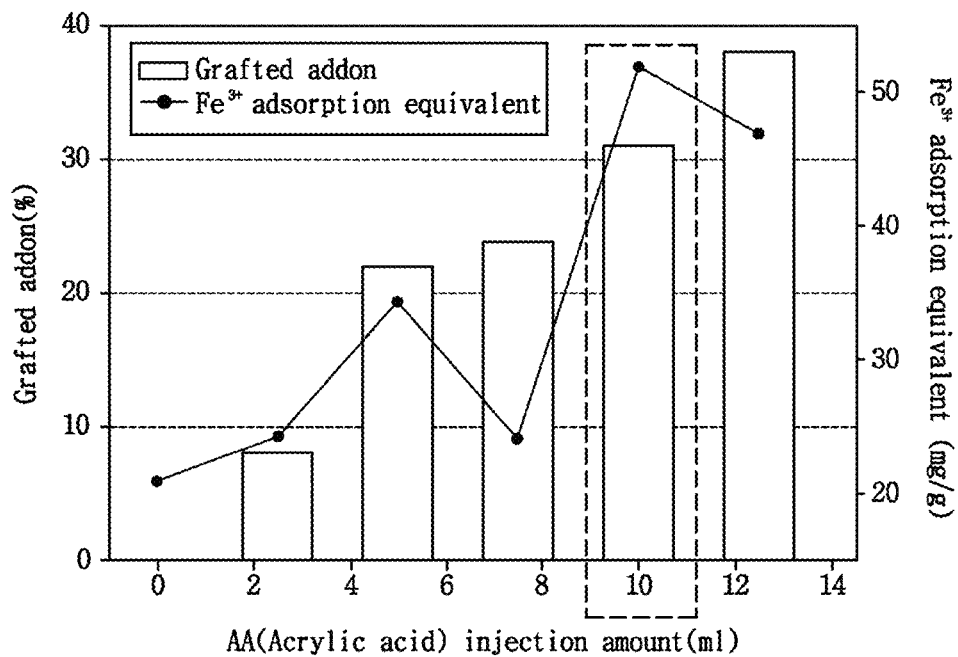
FIG. 3 illustrates changes in the iron adsorption equivalent and weight of a PVA support according to an acrylic acid (AA) injection amount.
Figure 4:
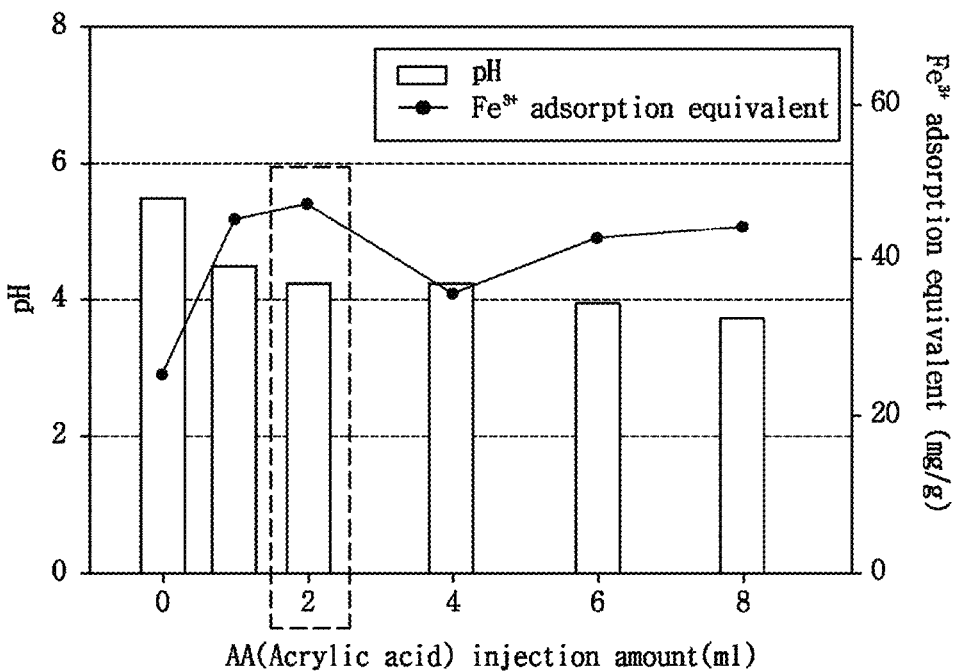
FIG. 4 illustrates changes in the iron adsorption equivalent and pH of a cellulose support according to an AA injection amount.

The appropriate AA injection amounts for PVA/Cellulose, which are support materials, were examined by comparing a difference between iron adsorption equivalents and changes in weight after synthesis of surface-modified materials according to the AA injection amount (see FIGS. 3 and 4). The results were shown as $Fe^{3+}$ adsorption equivalents and changes in weight before/after surface modification of the synthesized support materials according to the AA injection amount, and the difference in weight between before and after synthesis showed that the weight change was also increased with an increase in AA injection amount.

In the case of a PVA sponge material, it was found that the crosslinking component of AA was located in a space between pores thereof, and thus a larger amount of material was synthesized as the amount of the crosslinking component was increased. However, with regard to the iron adsorption amount, the iron adsorption equivalent was shown to be reduced from an AA injection amount of 10 ml or more, which leads to blocking of a space between PVA sponge pores by the AA crosslinking component, resulting in increased weight, but iron was unable to be adsorbed due to the closed iron adsorption position. The appropriate AA injection amount for the surface modification of the PVA sponge was about 10 ml, which showed the highest iron adsorption equivalent, and the appropriate AA injection amount for the synthesis of a PAA-PVA material was set at 10 ml and an experiment was carried out (see FIG. 3).

In the case of a cellulose nonwoven fabric material, the weight difference between before and after synthesis is insignificant, and thus the performance evaluation of carboxyl groups only depended on the iron adsorption equivalent. The iron adsorption data showed a high iron adsorption equivalent at an AA injection amount of 2 ml, and the subsequent experiment was carried out after setting the appropriate AA injection amount for the surface modification of cellulose at 2 ml (see FIG. 4).

2. PB Stability Evaluation

A. Evaluation of PB Elution During Washing after Synthesis (Analyzed Wavelength: 690 nm)

To determine the degree of PB immobilization stability with or without surface modification, the degree of PB eluted when 5 washes were performed was measured using a spectrophotometer. PB-immobilized materials synthesized using in-situ and ex-situ methods were used, and wash water was analyzed at 690 nm, which is an absorbance wavelength of PB, and the degree of PB elution was confirmed in FIG. 5. When unmodified with acrylic acid, a chemical bonding force between PB and the support is merely derived from a hydroxyl group present in PVA/Cellulose, and PB immobilization strength is dependent on the unshared electron pair of the oxygen moiety of —OH.

Figure 5:
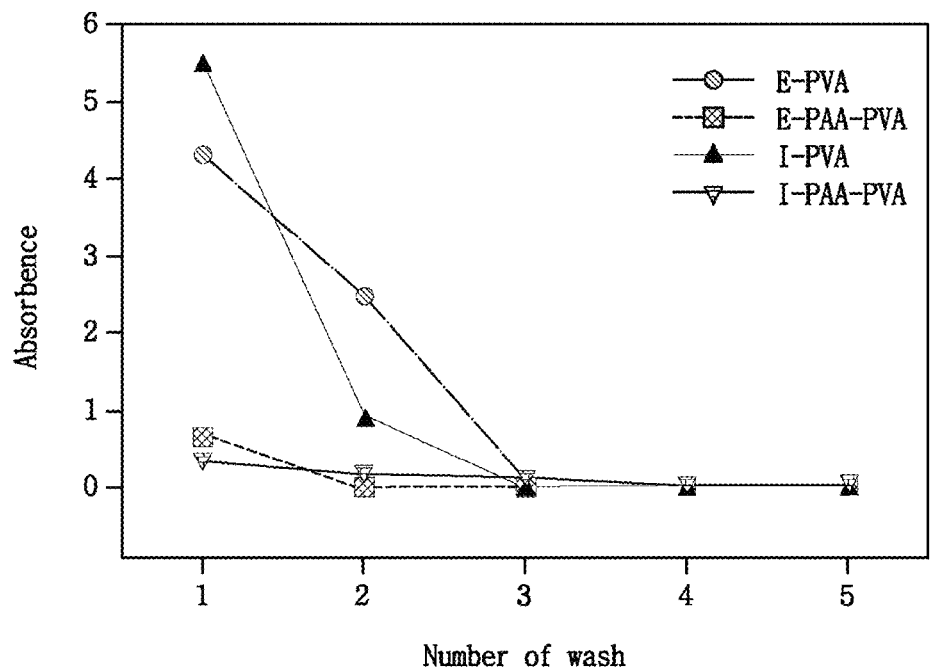
FIG. 5 illustrates absorbance values of PB released into wash water according to a PVA-PB synthesis method.

In the case of PVA, as illustrated in FIG. 5, it was confirmed that a very high concentration of PB was eluted upon one wash. It was confirmed from the result that, although a large amount of PB was located in pores, the immobilization strength of the hydroxyl group present in PVA was weak, and thus a large amount of PB present in pores had a strong attraction to water and accordingly, the residual and immobilized PB was eluted by washing. In contrast, when modified with acrylic acid, the amount of PB eluted upon washing was significantly reduced as can be seen from FIG. 5.

As a result of comparing PB samples synthesized using the in-situ and ex-situ methods, it was confirmed that in the case of in-situ synthesis, PB elution was reduced. These results indicate that the immobilization of PB occurs due to chemical bonding rather than capturing of physical particles. In the case of the in-situ synthesis, trivalent iron reacts with an anion such as a hydroxyl group or a carboxyl group to form an ionic bond, and then reacts with ferrocyanide ions to form PB. In contrast, in the case of the ex-situ synthesis, it can be determined that the already formed neutral PB particles are dependent on the action mechanism of being physically trapped in the polymer structure, and thus have a very low binding force such that a large amount of PB is removed by washing.

B. PB Content Analysis of Synthesized Samples

Figure 6:
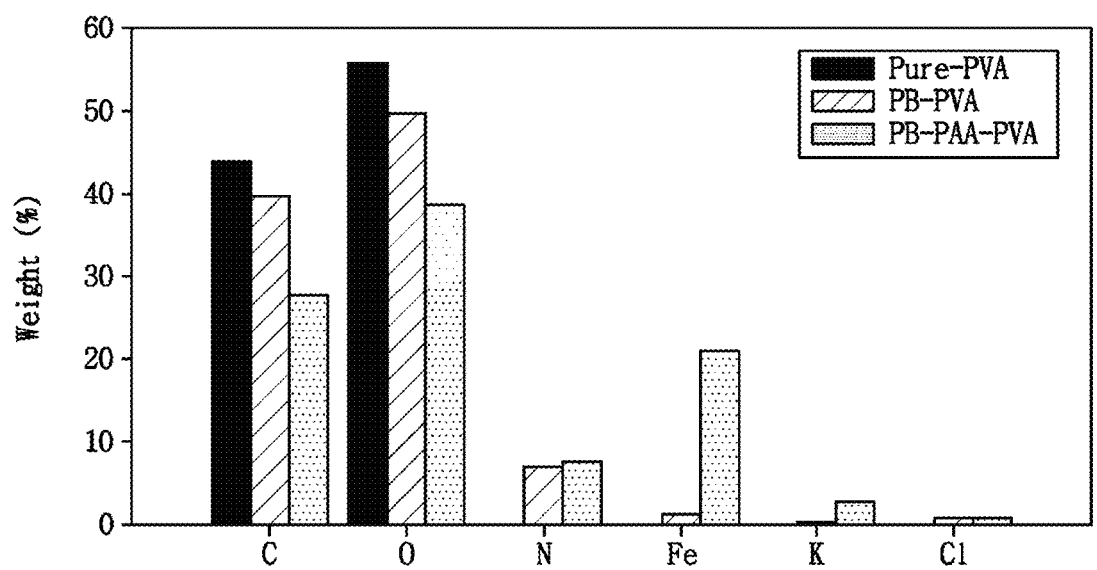
FIG. 6 illustrates elemental analysis results of a PVA material and materials (PVA-PB and PAA-PVA-PB) after Prussian blue attachment according to the presence or absence of modification.

To more quantitatively confirm an increase in the attached amount of PB according to surface modification, energy dispersive X-ray spectroscopy (EDS) were used. FIG. 6 illustrates changes in elemental analysis results with or without surface modification in the case in which PVA was used as a support and PB was synthesized using an in-situ method. The case of PVA used as a support shows analysis results of elements consisting of carbon and oxygen, which coincide with the composition of PVA itself. However, when PB was attached using an in-situ method, nitrogen and iron were detected. In this regard, the two elements are elements of the three elements constituting PB, from which it directly demonstrates the formation of PB. In the case of a sample (PB-PAA-PVA) surface-modified by acrylic acid, the proportion of iron was dramatically increased and measured to be about 20%, which was significantly increased about 10 times from 2% in the sample before surface modification, and this indicates that the amount of attached PB was significantly increased after surface modification.

3. Comparison for Cesium Adsorption Capacity (Batch Test)

Figure 7:
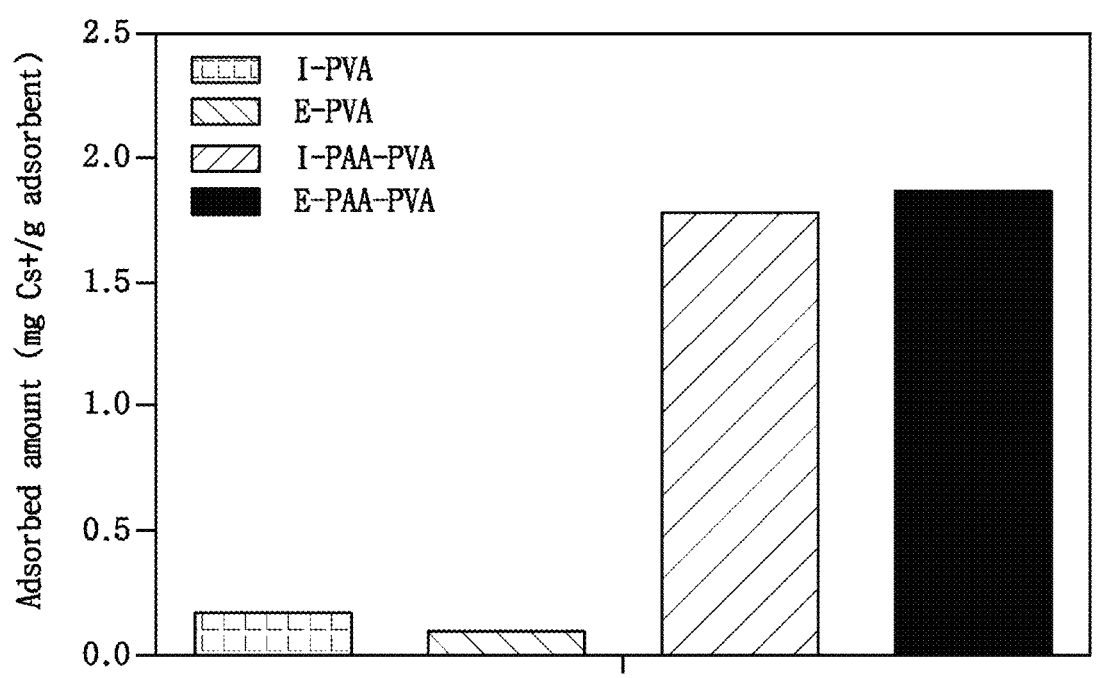
FIG. 7 illustrates cesium adsorption results of PVA modified/unmodified by acrylic acid according to an in-situ method and an ex-situ method.

To compare the cesium adsorption performance of the synthesized adsorbent materials, an adsorption test was carried out at a $Cs^+$ initial concentration of 5 mg/L, and the results are illustrated in FIG. 7. A sample modified by acrylic acid exhibited a much stronger cesium adsorption capability than that of an unmodified sample, and this result coincides with the amount of immobilized PB. An approximately 6-fold to about 10-fold increase in adsorption capability was exhibited in the sample modified with acrylic acid compared to the unmodified sample.

4. LBL Evaluation

A. Evaluation of PB Elution According to Application of LBL Assembly

As described above, cesium adsorbent materials with excellent performance could be obtained through surface modification and in-situ synthesis, but a trace amount of PB was partially eluted during synthesis and when used, and thus it was determined that this might act as an obstacle to actual application to a water treatment process. Such an elution phenomenon is determined to be due to non-immobilized PB present in pores, and to minimize this phenomenon, an LBL method was devised to maintain the concentration ratio of trivalent iron to ferrocyanide ions. The LBL method is a method of further supplying iron ions to the synthesized PAA-PB decontamination material, e.g., additional injection of $FeCl_3$ after ferrocyanide was attached.

Figure 8:
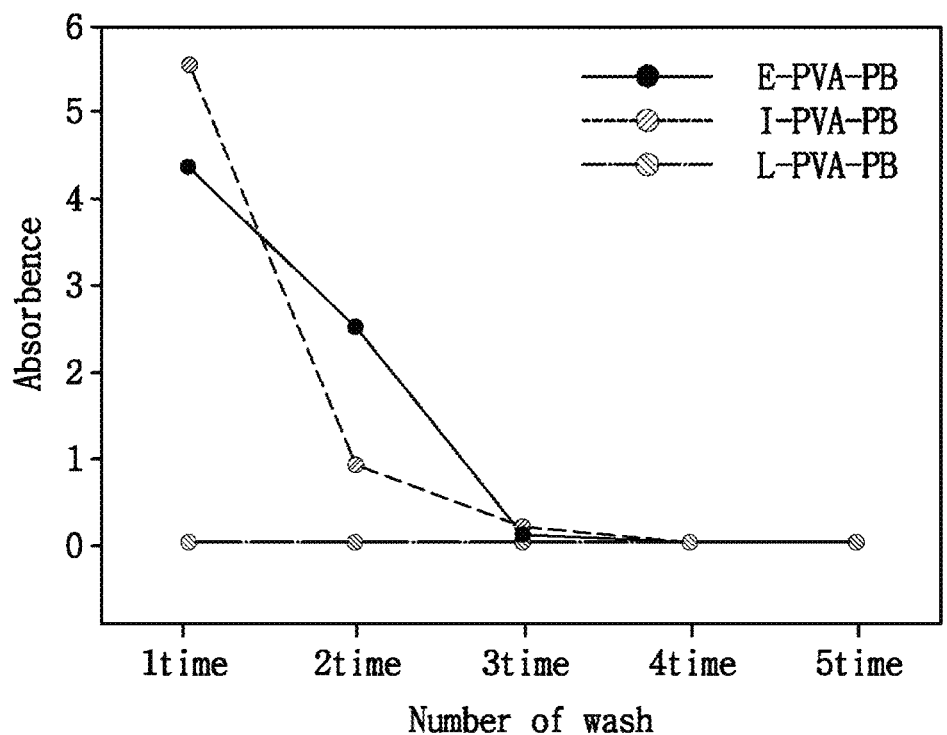
FIG. 8 illustrates results of PB elution into wash water of unmodified PVA groups and cellulose materials that were synthesized according to the in-situ, ex-situ, and LBL methods.
Figure 8:
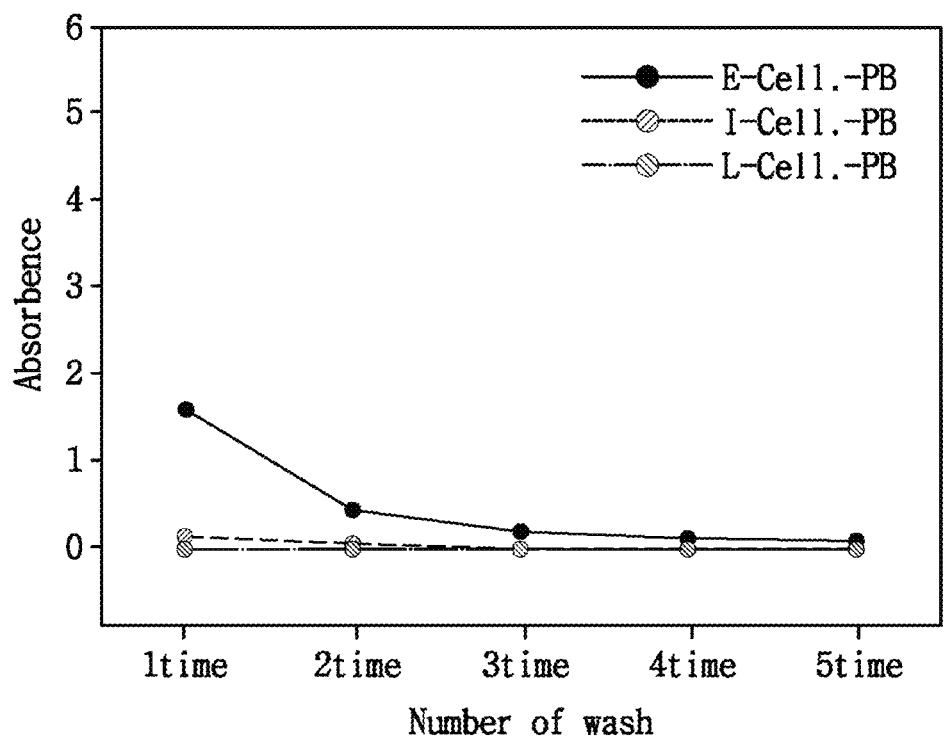

FIG. 8 illustrates results of measuring PB eluted during washing after PB was synthesized using an in-situ, ex-situ, or LBL method by using PVA and cellulose that were not modified with acrylic acid. In the cases of in-situ and ex-situ, it was confirmed that a considerably large amount of PB was eluted upon one wash, whereas excellent results, i.e., little elution of PB even upon one wash, were confirmed in the case of the LBL method.

The stability of PB can be confirmed even through weight changes shown in Table 3. With regard to the weight change, the decontamination material synthesized using an existing in-situ method exhibited an average 1.5% change, while the decontamination material synthesized using the LBL method exhibited a 3.3% change, which is two times or more the average 1.5% change, from which it was confirmed that PB was immobilized. This was confirmed due to the fact that, although PB particles form a $Fe_4[Fe(CN)_6]_3$ crystal, PB synthesized using the in-situ method has an insufficient iron ion proportion. Therefore, PB was able to be stably formed by additionally injecting iron chloride. Accordingly, it was confirmed that the LBL synthesis method is efficient as a PB synthesis method due to immobilization compared to the in-situ synthesis method.

TABLE 3

Increase in PB synthesis according to application of LBL method

| Sample Type | $FeCl_3$ injection concentration (mM) | $K_4Fe(CN)_6$ injection concentration (mM) | $FeCl_3$ injection concentration (mM) | weight change (mg) | Rate of change |
|---|---|---|---|---|---|
| In-situ | 20 | 20 | — | 3.9 | 1.5% |
| LBL | 20 | 20 | 20 | 8.2 | 3.3% |

5. Adsorbent Material Evaluation (PVA)

Cesium adsorbent materials were developed by a combination of the AA surface modification method and the PB LBL synthesis method, and the results were superior to those of the above two cases. The results for characterization and cesium adsorption performance of the cesium adsorbent materials prepared using the AA surface modification and PB LBL synthesis method, which exhibited excellent performance, have been shown.

Figure 9:
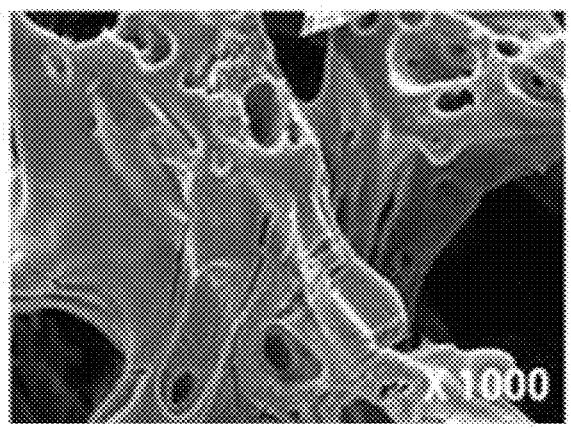
FIG. 9 illustrates SEM images of adsorbent materials (PVA and cellulose) to which acrylic acid surface modification and a LBL method were applied.
Figure 9:
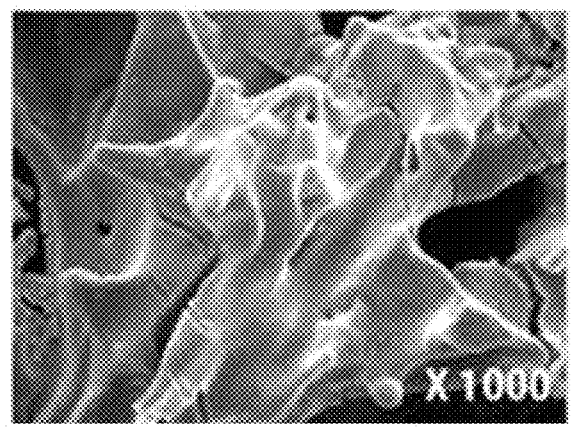
Figure 9:
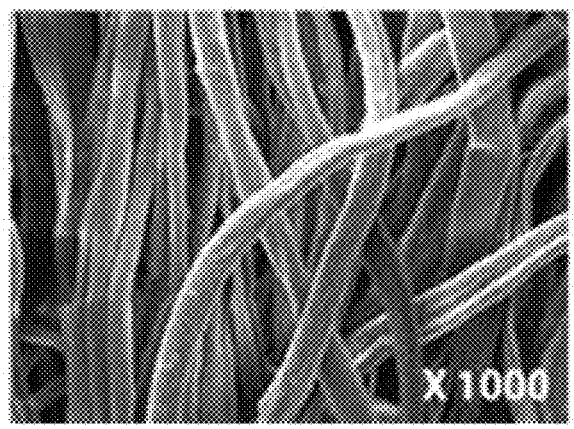
Figure 9:
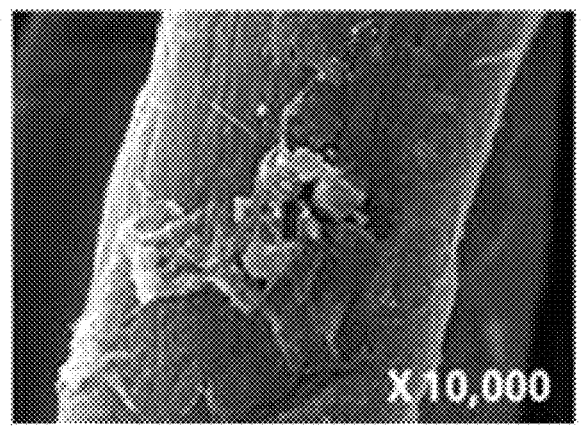

To observe the surfaces of the adsorbent materials and also analyze elemental compositions thereof, SEM/EDS were used. FIG. 9 illustrates SEM images showing PVA- and cellulose-based adsorbent materials synthesized using AA surface modification and the LBL method. Referring to the cross-section of the PAA-PVA-PB decontamination material synthesized using the LBL method, the size of pores was significantly decreased and the material exhibited mineral properties such as the presence of cracks in the polymer stem. Referring to the surface image, pores were not shown and a blunt shape was observed at the end of the stem, which appeared as a horned shape formed such that the rectangular parallelepiped crystal structure, which is a characteristic of PB, of the synthesized material was crushed by compression upon washing, from which it was confirmed that the AA crosslinking component immobilized PB particles and PB was stably formed on the surface of the polymer due to the supply of iron ions according to the LBL method. Even in the case of the cellulose material, PB particles having a size of about 20 μm were observed on the surface of the cellulose material.

To indirectly determine the PB content of the synthesized material, EDS elemental analysis results were used. Since both PVA and cellulose are materials consisting of C, H, and O, the constituent elements of PB, which are distinguishable from the support, are Fe and N, and this is a result considered as a reference of the PB content. As shown in Table 4, of the materials synthesized using the in-situ and LBL methods, the iron content was detected more at the surface of the material synthesized using the LBL method, i.e., about 1.5 times that of the material synthesized using the in-situ method. In addition, among the materials synthesized using the LBL method, the material that was surface-modified by AA corresponds to about 39% of the total weight, from which it can be seen that a large amount of PB was distributed in the material. This is a value that is 1.5 times or more the content before surface modification.

In addition, in the case of the cellulose material, it was confirmed that the content of iron immobilized by carboxyl groups was increased about 4 times that of iron ions immobilized by hydroxyl groups.

TABLE 4

EDS elemental analysis results of each decontamination material

| Type of material | | C | N | O | K | Cl | Fe |
|---|---|---|---|---|---|---|---|
| Blank | PVA sponge | 44.15 | Not detected | 55.85 | Not detected | Not detected | Not detected |
| | Cellulose | 47.44 | Not detected | 52.56 | Not detected | Not detected | Not detected |
| In-situ | PAA-PVA-PB | 41.45 | Not detected | 37.93 | Not detected | Not detected | 20.62 |
| L.B.L method | PVA-PB | 34.84 | 6.51 | 37.81 | 0.38 | 0.72 | 19.74 |
| | PAA-PVA-PB | 27.79 | 6.20 | 34.33 | 2.26 | Not detected | 29.41 |
| | Cellulose-PB | 28.22 | 6.52 | 60.55 | Not detected | Not detected | 4.71 |
| | PAA-Cellulose-PB | 26.16 | 6.08 | 50.89 | Not detected | Not detected | 16.87 |

Evaluation of Adsorption Capacity and PB Elution of PVA Sponge (LBL-PAA-PVA-PB)

Figure 10:
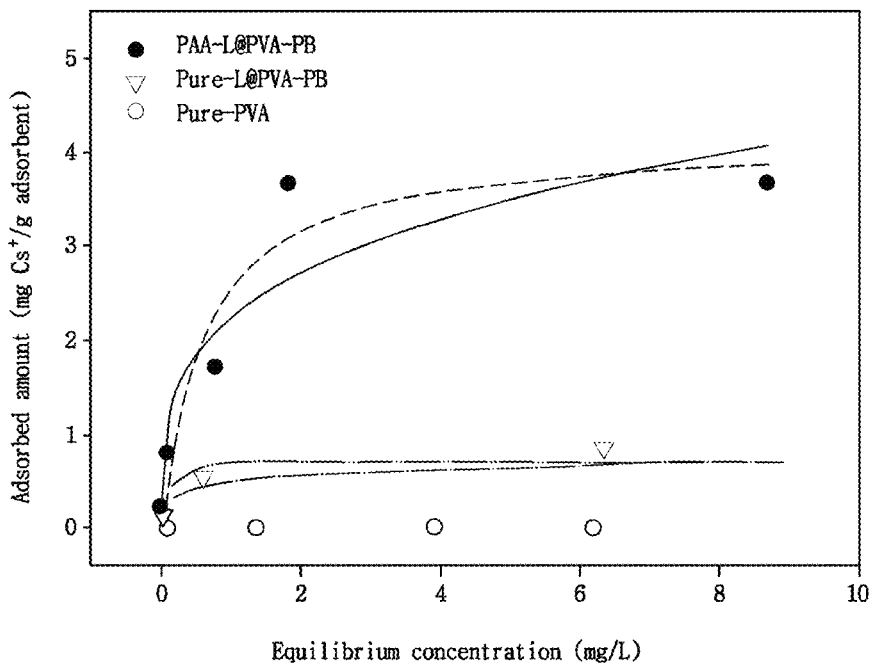
FIG. 10 illustrates the adsorption isotherms and Langmuir & Freundlich models of modified/unmodified PVA-PB decontaminated materials prepared using a LBL method.

The isothermal adsorption behavior of PVA-PB synthesized under unmodified-LBL conditions, which is a control, is illustrated in FIG. 10. The isothermal curves were interpreted using Langmuir & Freundlich models. Constants therefor are summarized in Table 5. According to the present numerical analysis, the Freundlich model exhibited a higher $R^2$ value than that of the Langmuir model, which suggests that the cesium adsorption behavior is not monomolecular adsorption but adsorption of cesium as several layers between pores. In addition, the affinity (n) was 6.1387, which indicates that the decontamination material has low affinity with cesium ions. Based on the Langmuir model, the maximum cesium adsorption amount was calculated as about 0.71 mg/g of adsorbent material.

The adsorption behavior of a LBL-PAA-PVA-PB decontamination material selected as a material optimized by material characterization was also numerically interpreted using Langmuir & Freundlich models, and constants related to the results thereof are shown in FIG. 10 and Table 5. The calculated $R^2$ values of the two models were different from that of the control such that the Langmuir model exhibited a higher $R^2$ value, from which it was confirmed that the adsorption behavior is monomolecular adsorption behavior between pores. From the respective characteristics, it was confirmed that the affinity (n) between the decontamination material and cesium ions was calculated as 3.6284, which means the presence of attraction therebetween. In addition, the maximum adsorption amount ($q_m$) was 4.16 mg/g, which was increased about six times that of the control, and this was confirmed to be a reasonable value for cesium ion decontamination.

TABLE 5

Constants for Langmuir & Freundlich models

| | Langmuir isotherm | | | Freundlich isotherm | | |
|---|---|---|---|---|---|---|
| Sample | $q_m$ (mg/g) | KL (L/mg) | $R^2$ | $K_f$ ($mg^{1-1/n} L^{1/n}/g$) | 1/n | $R^2$ |
| L-PVA-PB | 4.1577 | 1.5770 | 0.9334 | 3.6284 | 2.2429 | 0.8907 |
| L-PAA-PVA-PB | 0.7131 | 12.6428 | 0.8797 | 6.1387 | 0.5063 | 0.9098 |

Figure 12:
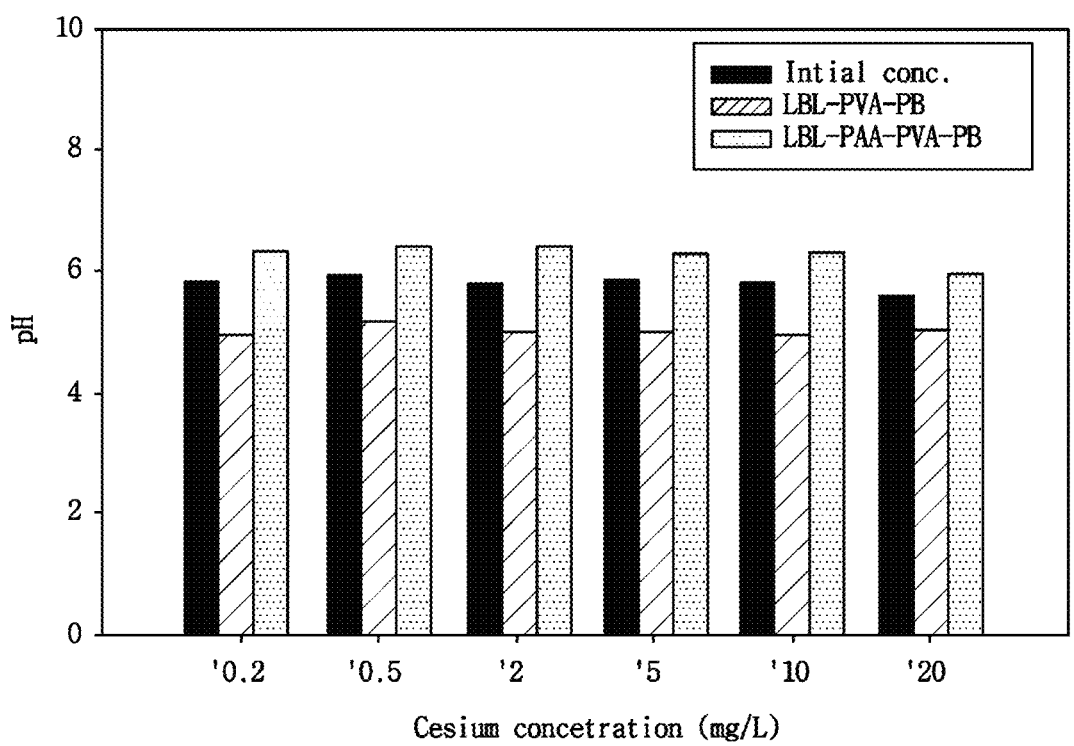
FIG. 12 illustrates changes in pH of each decontamination material according to cesium concentration after 24 hours of adsorption experiments.
Figure 12:
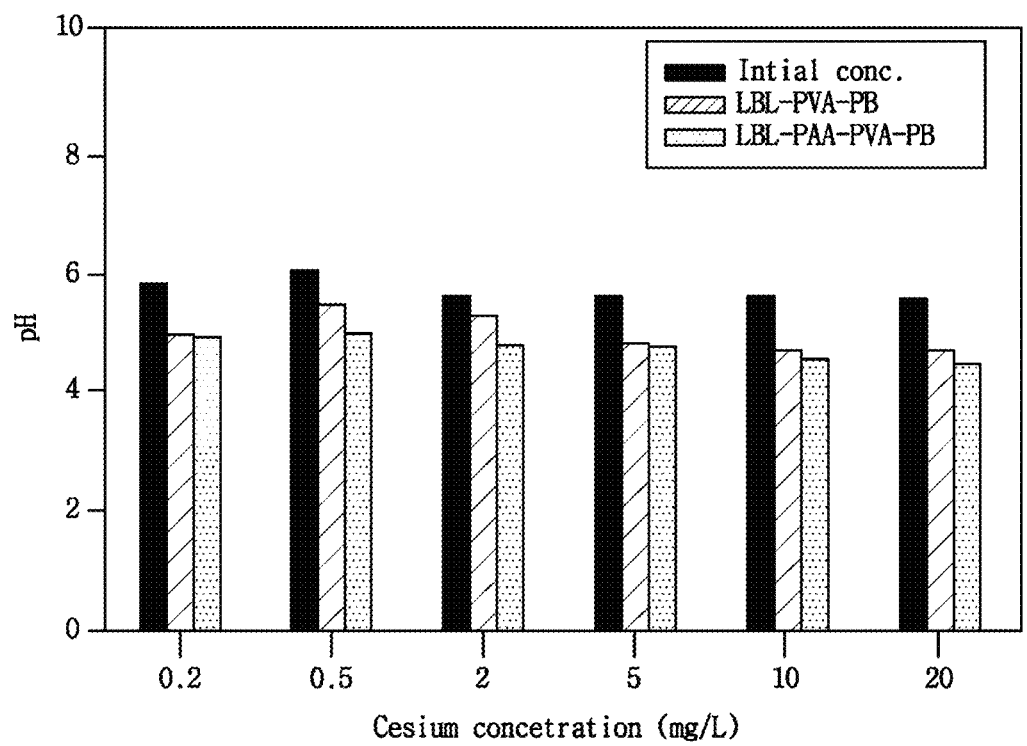

During isothermal adsorption, pH changes were observed at the beginning of the experiment and at the completion of the experiment. The initial pH of the cesium solution was about 5.8 to about 5.9, and regarding the pH change at the end of the adsorption experiment, as illustrated in FIG. 12, the LBL-PVA-PB decontamination material exhibited the lowest pH based on each cesium initial concentration, and this is because the acidity of the material in water was increased by unbound PB precursors (alkali metals). In contrast, the LBL-PAA-PVA-PB decontamination material, which belongs to the modified group, exhibited a pH range of about 6 to about 6.5, which was increased compared to the initial pH of the cesium solution. Thus, from the present pH change experiment results, it was confirmed that the LBL-PAA-PVA-PB decontamination material is suitable for use as a material for water treatment in water and does not affect the environment.

Figure 15:
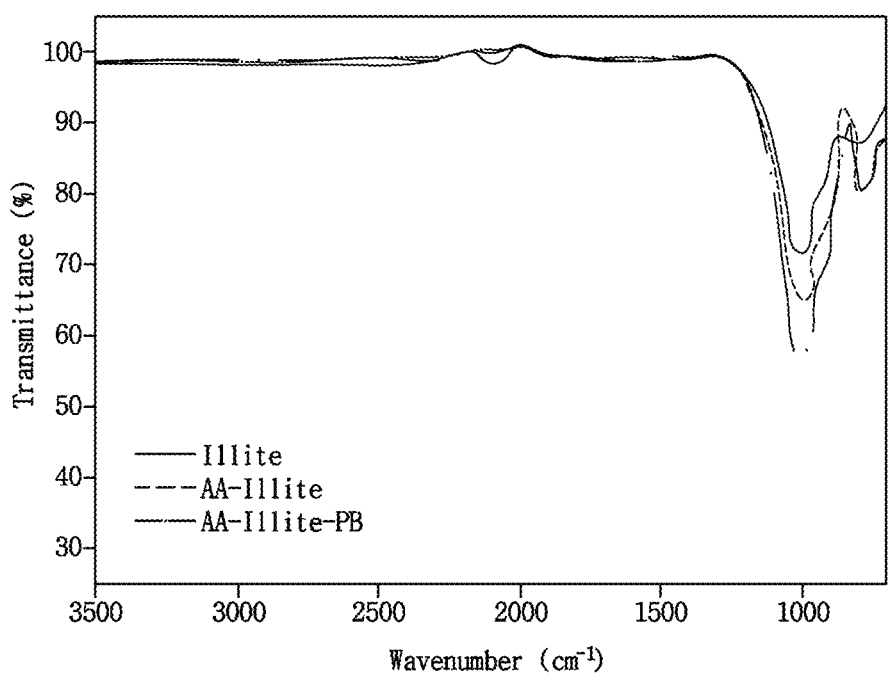
FIG. 15 illustrates Fourier-transform infrared spectroscopy (FT-IR) results of unmodified Illite, AA-Illite, and AA-Illite-PB.

Through PB elution evaluation, it was confirmed that PB was not eluted from the two materials (see FIG. 15). In absorbance analysis according to each cesium concentration after adsorption was completed, PB was analyzed as not detected in all cases at 690 nm, which is a color wavelength of the PB series, from which it was confirmed that, when such decontamination materials are applied to water treatment facilities of polluted regions, they are safe in terms of the occurrence of secondary contamination. Thus, these materials were evaluated as safe decontamination materials in stable adsorption and pH and PB elution evaluation and it was confirmed that these materials are cesium decontamination materials that do not cause environmental pollution.

6. Evaluation of Adsorbent Material (Cellulose Nonwoven Fabric)

Figure 11:
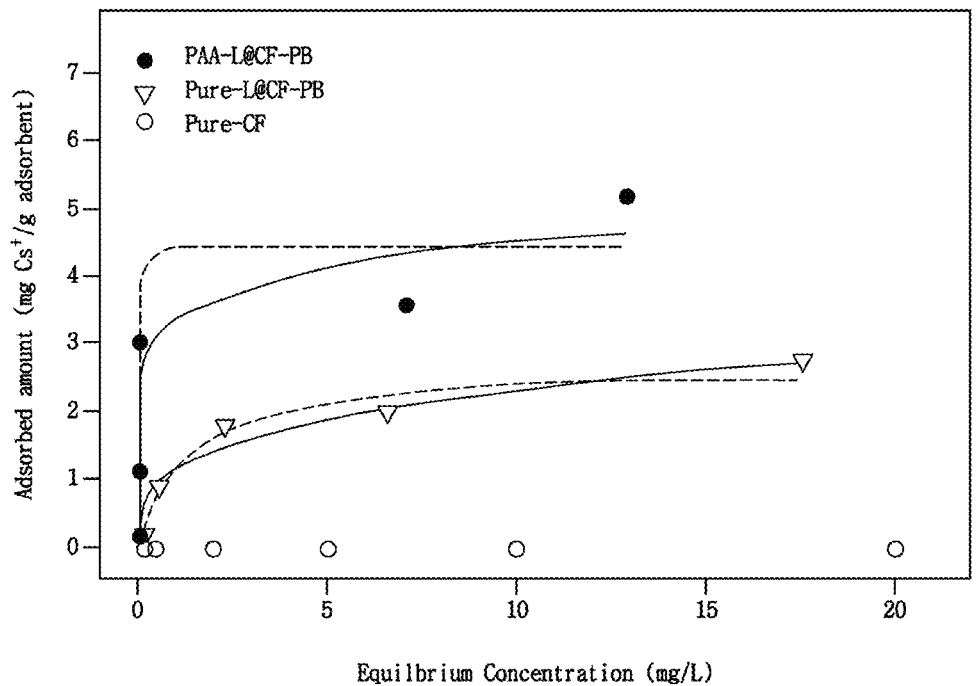
FIG. 11 illustrates the adsorption isotherms and Langmuir & Freundlich models of modified/unmodified CF-PB decontamination materials prepared using a LBL method.

First, the isothermal adsorption behavior of L-CF-PB synthesized under unmodified-LBL conditions, which is a control, is illustrated in FIG. 11. The isothermal curves were interpreted using Langmuir & Freundlich models. Constants therefor are summarized in Table 6. According to the present numerical analysis, the Freundlich model exhibited a $R^2$ value that was somewhat higher than or similar to that of the Langmuir model, which suggests that the cesium adsorption behavior is not only monomolecular adsorption but also adsorption of cesium as multilayers between pores. In addition, the affinity (n) was 3.518, which indicates that the decontamination material has affinity with cesium ions. Based on the Langmuir model, the maximum cesium adsorption amount was calculated as about 2.694 mg/g of adsorbent material.

The adsorption behavior of an L-PAA-CF-PB decontamination material selected as a material optimized by material characterization was also numerically interpreted using Langmuir & Freundlich models, and constants related to the results thereof are shown in FIG. 11 and Table 6. The calculated $R^2$ values of the two models were different from that of the control such that the Langmuir model exhibited a $R^2$ value that was somewhat higher but similar to that of the Freundlich model, from which it was confirmed that the cesium adsorption behavior is not only monomolecular adsorption behavior but also multilayer adsorption between pores. From the respective characteristics, it was confirmed that the affinity (n) between the decontamination material and cesium ions was calculated as 7.862, which indicates the increased attraction between the decontamination material and cesium ions compared to the unmodified sample. In addition, the maximum adsorption amount ($q_m$) was 4.437 mg/g, which was increased about two times that of the control, and this was confirmed to be a reasonable value for cesium ion decontamination.

TABLE 6

Constants of Langmuir & Freundlich models

| Sample | Langmuir isotherm | | | Freundlich isotherm | | |
|---|---|---|---|---|---|---|
| | $q_m$ (mg/g) | $K_L$ (L/mg) | $R^2$ | $K_f$ (mg$^{1-1/n}$ L$^{1/n}$/g) | $1/n$ | $R^2$ |
| L-PVA-PB | 2.694 | 0.7562 | 0.9733 | 1.201 | 0.2843 | 0.9822 |
| L-PAA-PVA-PB | 4.437 | 51.09 | 0.8967 | 3.343 | 0.1272 | 0.8878 |

During isothermal adsorption, pH changes were observed at the beginning of the experiment and at the completion of the experiment. The initial pH of the cesium solution was about 5.6 to about 6.0, and regarding the pH change at the end of the adsorption experiment, as illustrated in FIG. 12, the LBL-CF-PB decontamination material exhibited a somewhat decreased pH based on each cesium initial concentration, and the pH of LBL-PAA-CF-PB, which belongs to the modified group, was much more decreased. It was determined that the hydrogen group of the carboxyl group attached to the surface of the material when modified was not completely removed and remained prior to PB attachment, thus significantly reducing pH.

[Illite Support]

A method of preparing a cesium adsorbent including illite as a support includes: modifying a surface of the illite by treating the illite with acrylic acid so that the surface of the illite contains a carboxyl group; adding a sodium chloride (NaCl) solution to the illite to allow a reaction to occur therebetween; adding an iron chloride ($FeCl_3$) solution to the illite to allow a reaction to occur therebetween; adding a potassium ferrocyanide ($K_4Fe(CN)_6$) solution to the illite to allow a reaction to occur therebetween; and further adding the iron chloride ($FeCl_3$) solution to the illite.

The method may further include, after the modifying process, adding potassium persulfate ($K_2S_2O_8$) to the illite to allow a reaction to occur therebetween; and heating the illite in a nitrogen atmosphere to allow a reaction to occur therebetween.

Illite used in the present embodiment is a clay mineral, which is a mineral component formed by denaturation or weathering of orthoclase, and is utilized in various purification operations due to being inexpensive, eco-friendly, and rich in reserves, making it easy to supply and mass-produce. In addition, illite is known to efficiently adsorb cesium dissolved in water. Illite has low hydraulic conductivity and thus not only studies on the use of illite in preventing the diffusion of groundwater in areas contaminated with radioactive cesium and purifying the soil, but also studies on the removal of radioactive materials in water by using illite as a support have been conducted. Illite contains $K^+$ ions inside thereof and adsorbs radioactive cesium through ion exchange between $K^+$ ions and cationic radioactive cesium ions, which occurs in the interlayer and frayed edge inside the illite. At this time, cesium ions are irreversibly adsorbed onto the illite, and in particular, cesium ions were adsorbed onto the frayed edge, which is a weathered portion of the illite, and transferred to the interlayer of the illite over the long period of time. Through this, illite has properties of adsorbing cesium and desorbing a relatively small amount of cesium.

The surface modification of illite occurs such that the hydroxyl group thereof is converted into a carboxyl group using a grafting surface modification method using potassium persulfate and acrylic acid, in which a negative charge ($-COO^-$) is generated at the surface of the illite, and thus enhances binding affinity with PB, and the growth of PB at the surface of the absorbent material may be induced by LBL assembly.

PB immobilization is determined by the unshared electron pair of the oxygen moiety of the hydroxyl group present in surfaces of illite particles. PB has a strong attraction to water and weak immobilization with a hydroxyl group, and thus is easily released by washing after adsorption. Meanwhile, when the hydroxyl group of the illite was converted into a carboxyl group through modification by acrylic acid, binding between the negative charge present on the surface of the illite and PB was stably formed, thereby suppressing the release of PB by washing.

The LBL method is a method of further adding iron chloride after the existing in-situ method of PB, wherein iron ions bind to ferrocyanide that has not yet been bound to iron to form a PB crystal, thereby forming stable PB.

Hereinafter, a method of preparing an adsorbent by using illite as a support will be described in further detail with reference to specific examples, experiments, and the like.

Example 4: Preparation of Materials (Illite Support)

For the synthesis of a polymer of AA and illite (AA-Illite), acrylic acid (SAMCHUN, $CH_2CHCOOH$, 99.0%), potassium persulfate (SAMCHUN, $K_2S_2O_8$, 98.0%), an ethyl alcohol (SAMCHUN, $C_2H_5OH$, 70.0-75.0%) reagent, DI water, and powder-type illite were prepared. In addition, for the synthesis of PB on the polymer of AA and illite, sodium chloride (NaCl, SAMCHUN, 99.0%), iron (III) chloride hexahydrate (SAMCHUN, $FeCl_3.6H_2O$, 97%), and potassium ferrocyanide (SAMCHUN, $K_4Fe(CN)_6.3H_2O$, 97.0%) were prepared, and cesium chloride (SAMCHUN, CsCl, 99.0%) needed for the adsorption experiment and a radioactive cesium (Cs-137) standard source solution prepared by the Korea Research Institute of Standards and Science (KRISS) were prepared.

Example 5: Synthesis of AA-Illite-PB

AA-Illite was synthesized through three processes. In the first process, 2.5 g of illite was allowed to react with 60 ml of distilled water and 0.06 g of potassium persulfate as a radical initiator for 5 minutes to modify the —OH group inside the illite into an O radical, followed by adding 6 ml of acrylic acid to allow a reaction to occur therebetween for 5 minutes. In the second process, the temperature of the mixed solution of illite, acrylic acid, and potassium persulfate was lowered to 0° C., and then a reaction was allowed to occur therebetween in a nitrogen atmosphere for 20 minutes to remove oxygen inside the mixed solution. In the third process, the mixed solution was heated in a hot bath at 60° C. to 70° C. for 6 hours. To remove unreacted residual components attached to the sample after the reaction, illite, which had been surface-modified with a carboxyl group, was washed once with DI water and then washed with a mixed solution of ethanol and DI water at a ratio of 1:1, followed by drying in an oven at 80° C. for 6 hours, thereby completing the synthesis of AA-Illite.

For the synthesis of AA-Illite-PB, 2.5 g of the synthesized AA-Illite was allowed to react with a 0.5 M NaCl solution, and then PB was synthesized using the LBL method. The resulting support was immersed in 25 ml of a 20 mM $FeCl_3.6H_2O$ solution and stirred at 100 rpm for 1 day. Subsequently, solid-liquid separation was performed using a centrifuge (3,500 rpm for 15 minutes), followed by mixing with 25 mL of a 20 mM potassium ferrocyanide solution to allow a reaction to occur therebetween for 5 minutes. Thereafter, solid-liquid separation was performed in the same manner as described above, and the resulting product was then allowed to react again with 25 mL of a 20 mM $FeCl_3.6H_2O$ solution, followed by washing several times with distilled water and drying in an oven at 60° C. for 6 hours. To confirm whether PB was desorbed from the synthesized AA-Illite-PB, the PB concentration of wash water used to wash AA-Illite-PB and a polymer of unmodified Illite and PB (Illite-PB) was measured through ultraviolet-visible (Uv-Vis) spectroscopy.

Experiment: Illite Support

Surface Characterization of AA-Illite-PB Particles

For the surface characterization of AA-Illite particles, illite, Illite-PB, and AA-Illite-PB were analyzed using an SEM (TESCAN, VEGA3, Czech Republic). In addition, to measure the polymer content of AA-Illite, thermogravimetric analysis (TGA, TA Instrument, SDT, USA) was performed under a nitrogen atmosphere in a range of 0 degree to 1,000 degrees. Additionally, the contents of elements constituting the adsorbent were analyzed through EDS. X-ray diffraction (XRD) analysis and Fourier-transform infrared spectroscopy (FT-IR, Bruker, TENSOR27, Germany) of the sample were performed at room temperature, and spectrum ranges were between 10 degrees and 90 degrees and between 400 $cm^{-1}$ and 4,000 $cm^{-1}$, respectively.

Isothermal Adsorption Experiment of AA-Illite-PB

For the isothermal adsorption experiment of AA-Illite-PB, PB was chemically immobilized to the surface functional groups of the AA-modified illite particles through the in-situ method. Subsequently, 1,000 $mgL^{-1}$ of a stock solution was prepared using CsCl and then diluted to thereby prepare a 10 $mgL^{-1}$ (ppm) solution. For the isothermal adsorption experiment, 0.01 g to 5 g of illite was added to a 50 mL CsCl solution to allow a reaction to occur therebetween for 24 hours to confirm Cs adsorption efficiency, and the adsorption efficiency was confirmed through inductively coupled plasma-mass spectroscopy (ICP-MS, Perkin-Elmer SCIEX, NexION 350D, USA).

To perform an experiment for Cs-137 adsorption of AA-Illite-PB, 200 Bq/L of a Cs-137 solution was prepared and allowed to react with 0.01 g of AA-Illite-PB for 24 hours. The Cs-137 removal efficiency was measured using a radiation measuring instrument (Nucare, RAD IQ F S200, Korea) equipped with a MCA and a digital MCA inside a 20 mm-thick lead shield.

The pH of 10 $mgL^{-1}$ CsCl used in the pH effect evaluation was adjusted to 4, 6, 8, and 10 using an aqueous NaOH solution and an aqueous $HNO_3$ solution, and 0.01 g of AA-Illite-PB was added thereto to allow a reaction to occur therebetween for 24 hours to confirm the Cs adsorption efficiency.

Experimental Results: Illite Support

1. Characterization of AA-Illite-PB Polymer

Figure 13:
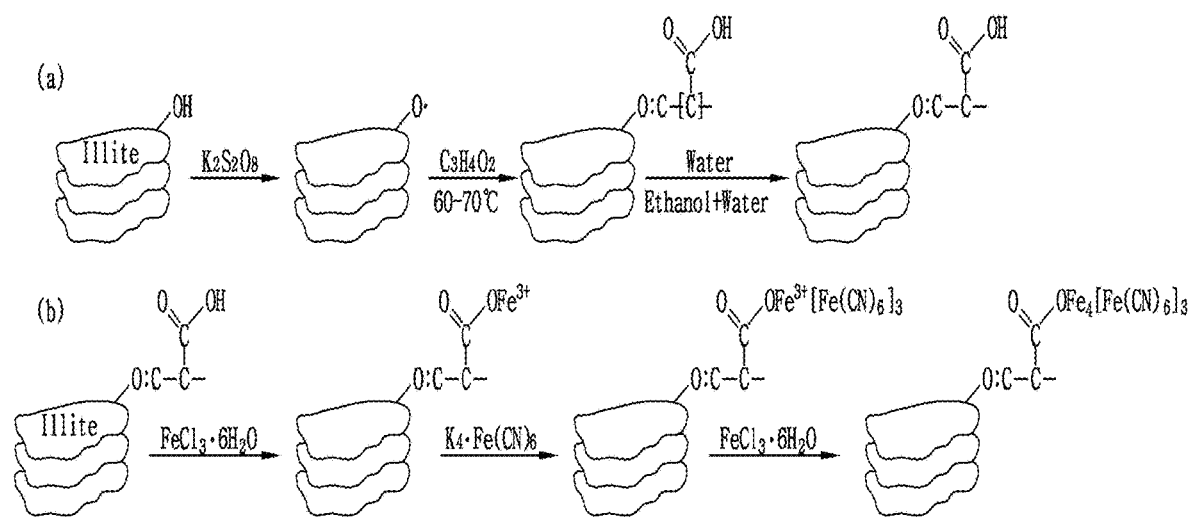
FIG. 13 illustrates processes of preparing AA-Illite (a) and AA-Illite-PB (b) (in-situ)
Figure 14:
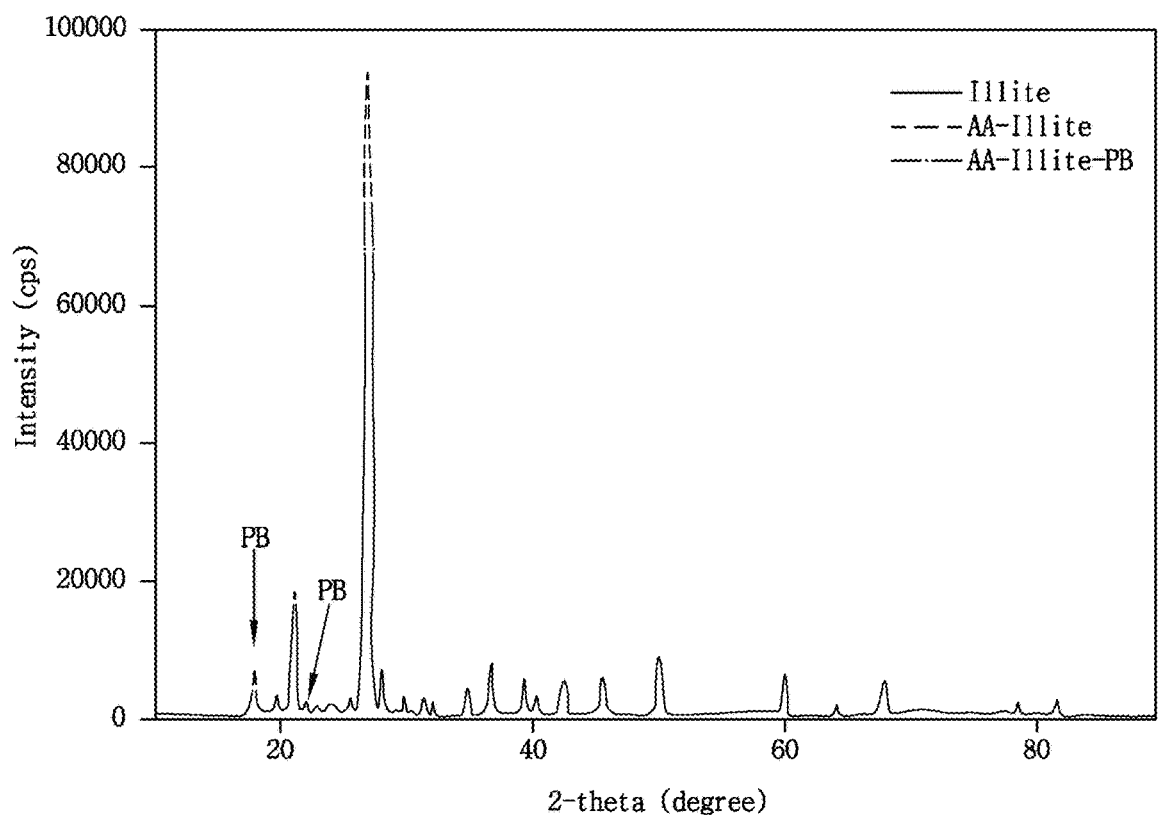
FIG. 14 illustrates elemental analysis results of unmodified Illite, AA-Illite, and AA-Illite-PB through X-ray diffraction (XRD) analysis.

A process of synthesizing PB by modifying illite with the water-soluble monomer AA is illustrated in FIG. 13. 2.5 g of powdered illite was allowed to react with 0.06 g of potassium persulfate, which is a water-soluble radical reaction initiator, to convert the hydroxyl group contained in the illite into an O radical. Subsequently, 6 mL of AA was injected and stirred, and then $N_2$ gas was introduced at 0° C. to allow a reaction to occur therebetween for 20 minutes to remove oxygen in the solution. Thereafter, to induce chemical bonding through a covalent bond between the 0 radical produced in the illite and AA, the AA-Illite polymer was synthesized through polymerization at a temperature ranging from 60° C. to 70° C. for 6 hours. 6 hours after the reaction, the reaction product exhibited viscosity, and AA-Illite with the carboxyl group produced by the binding of the AA polymer was finally washed sequentially with distilled water and a mixed solution of ethanol and distilled water to remove the AA monomer and polymer that had not been bound to the surface of the illite. 2.5 g of the synthesized AA-Illite was allowed to react with 0.5 M sodium chloride to substitute the COOH group of the surface of AA-Illite with COONa, thereby enhancing properties such as hydrophilicity, hygroscopicity, and the like, and AA-Illite was immersed in a 20 mM $FeCl_3.6H_2O$ solution for 1 day to substitute COONa of the surface of AA-Illite with COOFe by using Fe' ions. Subsequently, PB was synthesized on the carboxyl group of AA-Illite using a potassium ferrocyanide solution through the in-situ method. FIG. 14 illustrates elemental analysis results of Illite, AA-Illite, and AA-Illite-PB through XRD analysis, showing the presence or absence of PB in AA-Illite-PB. Generally, peaks corresponding to PB appear at 17.4 degrees, 24.7 degrees, and 35.3 degrees. As a result of the XRD peak analysis of Illite, AA-Illite, and AA-Illite-PB, the corresponding peaks appeared in all the illite cases, and as a result of the peak analysis of AA-Illite-PB, PB peaks similar to those reported in previous studies were found. Through this, it was confirmed that PB was effectively synthesized on AA-Illite.

FIG. 15 illustrates FT-IR spectra results of Illite, AA-Illite, and AA-Illite-PB. Illite has a Si—O bond around 1,000 $cm^{-1}$, and from the FT-IR analysis results of AA-Illite and AA-Illite-PB, it can also be confirmed that the Si—O bond appeared around 1,000 $cm^-$. From these results, it was confirmed that both AA-Illite and AA-Illite-PB exhibited the properties of illite. In addition, in the case of AA-Illite-PB, a peak was confirmed around 2,060 $cm^{-1}$ to 2,080 $cm^{-1}$ which represents a CN bond, which indicates the presence of PB in AA-Illite-PB.

Meanwhile, as a result of comparing unmodified illite, Illite-PB, and AA-Illite-PB, it was confirmed that PB particles were less bound to the surface of the unmodified illite, whereas a large amount of PB particles were bound to the surface of illite modified by AA. These results can be confirmed from elemental analysis results through EDS, and the results are the same as those shown in Table 7. Illite used in the experiments consists of oxygen (O) and silicon (Si), and Illite-PB synthesized using the in-situ method had a Fe content of 5 wt %, from which it was confirmed that PB was synthesized. It was also confirmed that AA-Illite-PB had a Fe content of 40 wt %, which is about 8 times higher than that of Illite-PB. These results suggest that illite modified with AA more efficiently immobilizes a large amount of PB than the surface of unmodified illite.

TABLE 7

| EDS results (weight %) | | | | | |
|---|---|---|---|---|---|
| | O | K | Si | Al | Fe |
| Illite | 42 | — | 58 | 0.24 | — |
| Illite-PB | 30 | 14 | 31 | 19 | 5 |
| AA-Illite-PB | 32 | 2 | 16 | 10 | 40 |

Figure 16:
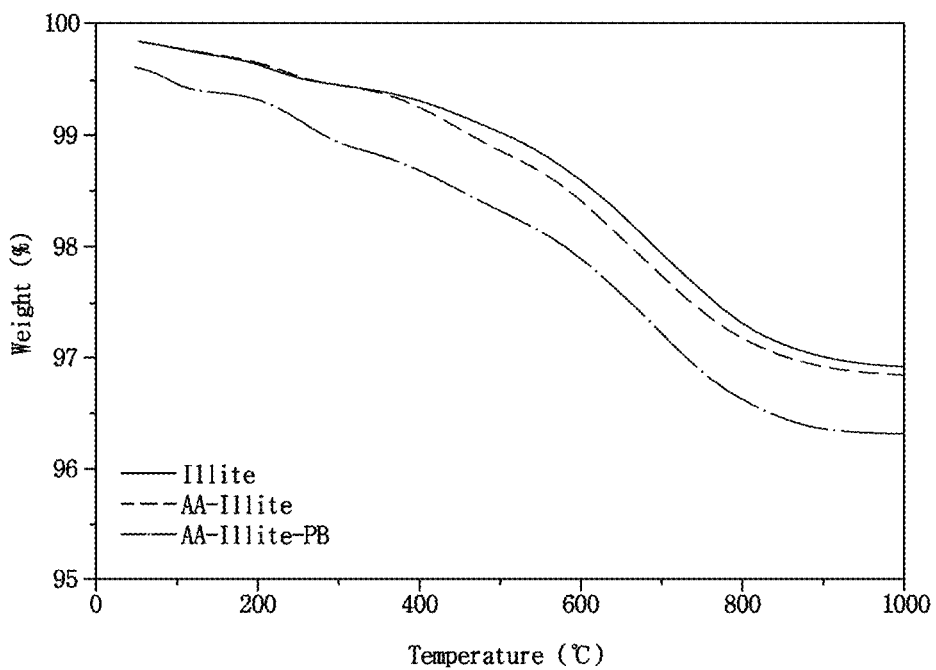
FIG. 16 illustrates thermogravimetric analysis (TGA) results of unmodified Illite (a), Illite-PB (b), and AA-Illite-PB (c)

Measurement results obtained in a nitrogen atmosphere through TGA in a range of 0 degree to 1,000 degrees are illustrated in FIG. 16. It was confirmed that illite was gradually decomposed with an increase in temperature. It was also confirmed that the decomposition of AA-Illite was accelerated around 350 degrees compared to the initial weight, thus exhibiting an approximately 3% weight decrease around 1,000 degrees, and the decomposition of AA-Illite-PB was gradually accelerated, thus exhibiting an approximately 3.3% weight reduction around 1,000 degrees. Through these results, it can be confirmed that AA-Illite has an AA weight fraction of about 3% and AA-Illite-PB has AA and PB weight fractions of about 3.3%. It can also be confirmed that PB desorption from AA-Illite-PB occurs as the temperature thereof increases.

2. Evaluation of Cesium Adsorption Performance of AA-Illite-PB

Figure 17:
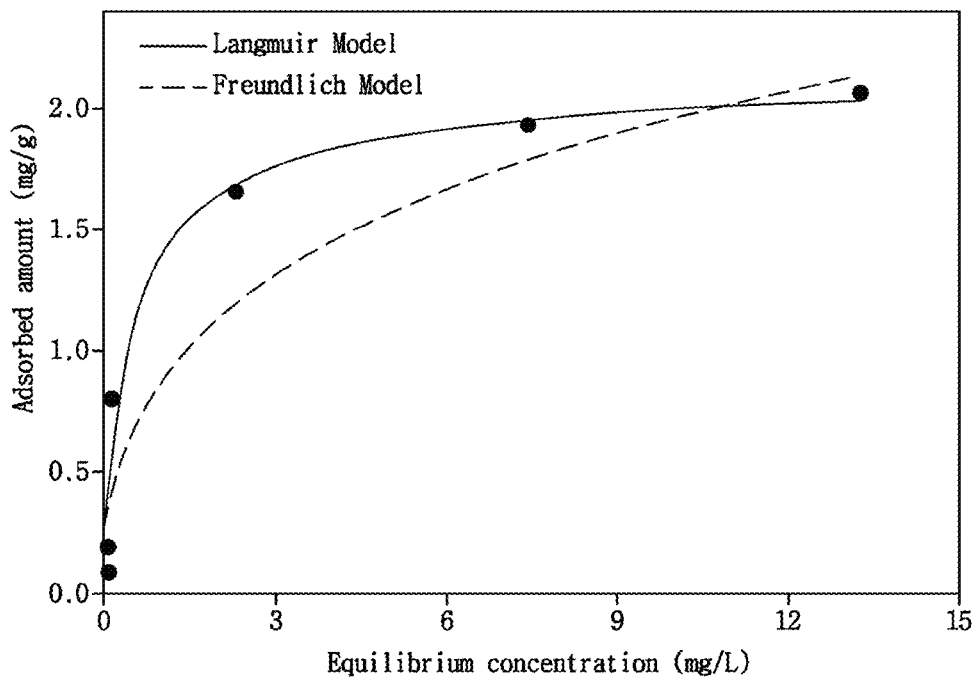
FIG. 17 illustrates adsorption isotherms of a cesium adsorption experiment for AA-Illite-PB.

Cesium adsorption experiments were carried out on AA-Illite-PB prepared by synthesizing PB on the synthesized AA-Illite using $FeCl_3 \cdot 6H_2O$ and potassium ferrocyanide solutions via the in-situ method (see FIG. 17). The maximum adsorption amount of AA-Illite-PB was equivalent to 2.0029 $mgg^{-1}$, and equilibrium data was fitted to Langmuir and Freundlich isothermal adsorption models. For the Langmuir isothermal adsorption model, it was assumed that adsorption occurred at uniform specific sites by uniform adsorption energy. $q_m$ ($mgL^{-1}$) denotes the maximum adsorption capacity of a single layer, and $K_L$, which is the Langmuir constant, denotes adsorption energy. For the Freundlich isothermal adsorption model, it was assumed that the surface of the adsorbent has different adsorption energies. In the Freundlich isothermal adsorption model, $K_f$ is an index indicating adsorption capacity and n is a constant indicating adsorption strength. The adsorption constants of the Langmuir isothermal adsorption model and the Freundlich isothermal adsorption model are shown in Table 8. The correlation coefficients ($R^2$) of the Langmuir isothermal adsorption model and the Freundlich isothermal adsorption model are 0.9331 and 0.8660, respectively, which is larger in the Langmuir isothermal adsorption model. From these results, it was confirmed that cesium tends to be uniformly adsorbed as a single layer between pores and physically adsorbed.

TABLE 8

| Adsorption constants of Langmuir isothermal adsorption model and Freundlich isothermal adsorption model | | | | | | |
|---|---|---|---|---|---|---|
| Temperature | Langmuir isotherm | | | Freundlich isotherm | | |
| (K) | $q_m$ | $K_L$ | $R^2$ | $K_f$ | N | $R^2$ |
| 300 | 2.0029 | 3.6552 | 0.9331 | 1.0677 | 3.5562 | 0.8660 |

Figure 18:
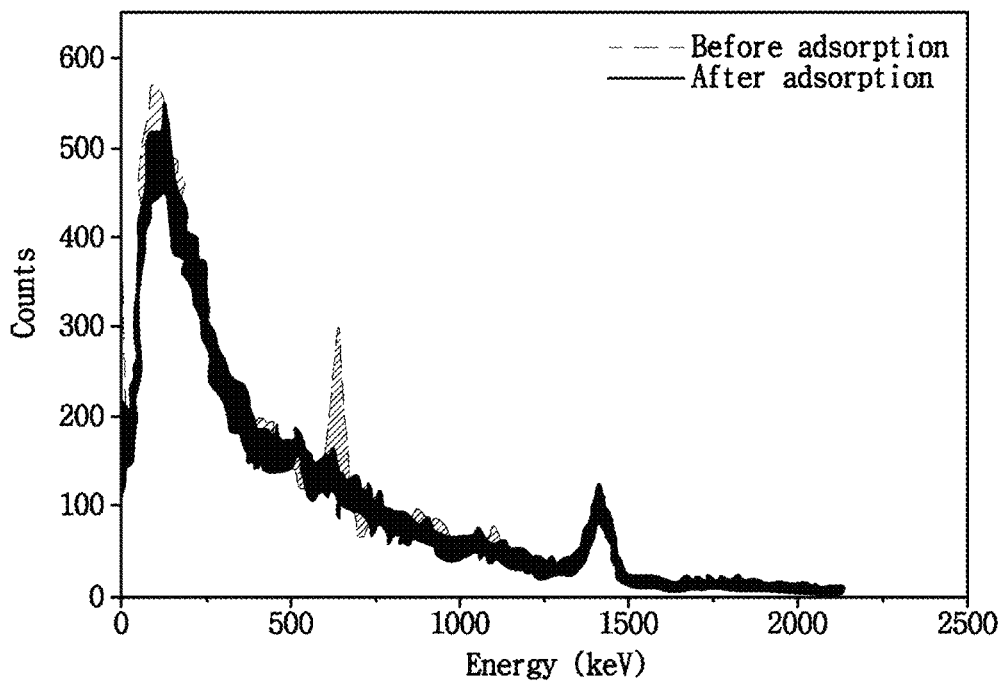
FIG. 18 illustrates Cs-137 adsorption experimental results of AA-Illite-PB.

Adsorption experiments were conducted to measure the Cs-137 removal ability of AA-Illite-PB in water (see FIG. 18). 0.01 g of AA-Illite-PB was added to 500 mL of a solution containing 200 Bq/kg of Cs-137 to allow a reaction to occur therebetween for 24 hours. The sample solution before the reaction with the adsorbent showed a peak at 662 keV, which indicates the characteristic of Cs-137. However, the sample solution after the reaction with the adsorbent showed no peak at 662 keV. From these results, it was confirmed that Cs-137 was adsorbed onto AA-Illite-PB.

The Cs-137 removal efficiency (%) and detection limit (DL) of AA-Illite-PB are shown in Table 3. As a result of analyzing the sample using a radiation measurement device, Cs-137 was measured to be 4.66 Bq/kg, which indicates 98% of the initial concentration of 200 Bq/kg was removed.

TABLE 9

| Cs-137 removal capacity of AA-Illite-PB | | | | |
|---|---|---|---|---|
| AA-Illite-PB | Cs-137 activity (Bq/kg) | | Performance | |
| (g $L^{-1}$) | Initial | Final | R (%) | DL |
| 0.02 | 200 | 4.66 | 98 | 4.96 |

3. PB Elution Analysis of Illite-PB and AA-Illite-PB

Figure 19:
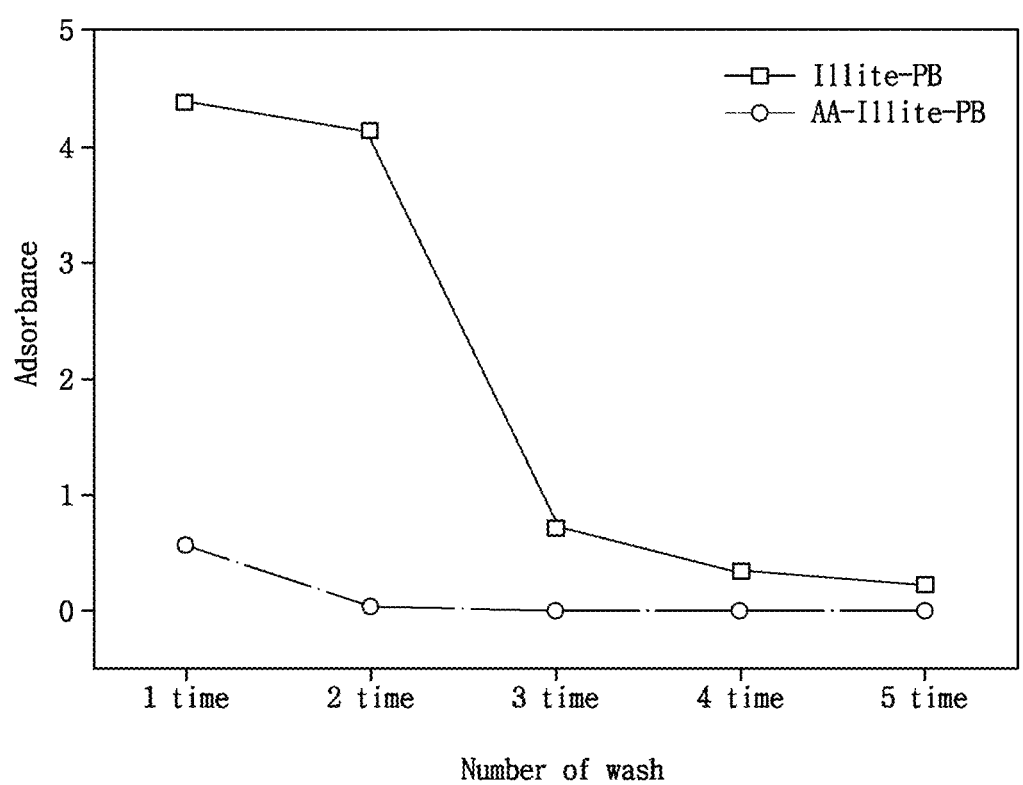
FIG. 19 illustrates the absorbance of PB eluted from wash water of Illite-PB and AA-Illite-PB.

After synthesis of PB on Illite and AA-Illite, each adsorbent was washed five times to perform sampling. The samples were subjected to UV-Vis spectroscopy to analyze PB desorption properties, and the results thereof are illustrated in FIG. 19. As illustrated in FIG. 19, it was confirmed that in the case of Illite-PB prepared using unmodified illite, a large amount of PB was eluted upon the first one to two washes. Subsequently, through five sampling procedures, it can be confirmed that a weak concentration of PB continues to be desorbed. In contrast, it was confirmed that in the case of AA-Illite-PB prepared by modifying illite with AA, a small amount of PB was desorbed upon the initial first wash, and then during 5 washes, PB was hardly eluted. This demonstrates that PB was chemically bound to the carboxyl group of the AA polymer synthesized on the surfaces of powdered illite particles and effectively immobilized without desorption. Through these results, it was confirmed that, when AA-Illite-PB was applied on-site, secondary environmental pollution due to PB desorption could be prevented.

[Powdered Activated Carbon Support]

A method of preparing a cesium adsorbent using powdered activated carbon as a support includes: modifying a surface of powdered activated carbon by oxidation so that the surface thereof contains a carboxyl group; forming an acyl chloride group on the surface of the oxidized activated carbon by reacting the oxidized activated carbon with thionyl chloride; preparing powdered activated carbon modified with a polymer by grafting the oxidized activated carbon with the polymer; growing the polymer at the surface of the powdered activated carbon modified with the polymer; and in-situ reacting the powdered activated carbon with iron (III) chloride and potassium ferrocyanide solutions.

When the activated carbon is used in water treatment processes, powdered activated carbon may be spread in water and uniformly dispersed, thereby effectively adsorbing and removing a radioactive material included in a water treatment target.

As the polymer, a covalent organic polymer (COP) is used, and the polymer binds to the surface of the powdered activated carbon to thereby form PB. In the present embodiment, melamine is used as the polymer and the polymer is not limited as long as it is a polymer enabling the in-situ synthesis of PB.

The COP used in the present disclosure is a chain-like polymer formed by a stepwise exchange reaction of hexahydropyrazine and cyanuric chloride, or by a synthetic method such as immobilization of an aromatic nitro and an aliphatic amine and was synthesized in the form of a shell of a net having pores of several nanometers on the surface of activated carbon particles. This creates an abundant adsorption-absorption surface area on the surface of the adsorbent.

In the present disclosure, PB synthesis occurred in pores of the COP synthesized on the surface of powdered activated carbon. The COP was immersed in an iron (III) chloride solution, and then a potassium ferrocyanide solution was added thereto via the in-situ method, which is used to prevent PB release after being used in adsorption.

In the present disclosure, in the adsorbent synthesis process, PB immobilization was performed using both physical and chemical methods. The iron (III) chloride and potassium ferrocyanide solutions were allowed to react in pores of the COP bound in a size of nanometers to the surface of support particles, thereby physically capturing PB. Simultaneously, iron (III) chloride ions are adsorbed by an amine group from among the functional groups of melamine, which is a polymer, and sequentially reacted with potassium ferrocyanide, resulting in chemical PB immobilization.

Hereinafter, the method of preparing an adsorbent using powdered activated carbon as a support will be described in further detail with reference to specific embodiments, experiments, and the like.

Example 6: Preparation of Materials (Powdered Activated Carbon Support)

For the preparation of COP-PAC, materials were prepared as follows: PAC (SAMCHUN), nitric acid (SHOWA, $HNO_3$, 60%), sulfuric acid (SAMCHUN, $H_2SO_4$, 33%), dichloromethane (SAMCHUN, $CH_2Cl_2$, 99%), thionyl chloride (DAEJUNG, $SOCl_2$, 99%), melamine (SAMCHUN, $C_3H_6N_6$, 99%), dimethyl sulfoxide (SAMCHUN, $(CH_3)_2SO$, 99%), diisopropyleneamine (SAMCHUN, $C_8H_{19}N$, 99%), terephthalaldehyde (Sigma Aldrich, $C_6H_4(CHO)_2$, 99%), acetone ($C_3H_6O$, 99%), and ethanol (SAMCHUN, $C_2H_6O$, 70%). In addition, for the preparation of COP-PAC-PB, an iron (III) chloride solution (SAMCHUN, $FeCl_3$, 97%) and a potassium ferrocyanide solution (SAMCHUN, $K_4Fe(CN)_6 \cdot 3H_2O$, 99%) were reacted using the in-situ method. Cesium chloride (SAMCHUN, CsCl, 99.0%) needed for the adsorption experiments and a radioactive cesium (Cs-137) standard source solution prepared by the KRISS were prepared.

Example 7: Synthesis of COP-PAC

Powdered activated carbon (COP-PAC), a surface of which had been modified with a polymer, was synthesized through four processes. In the first process, 20% PAC was allowed to react in 500 mL of a mixture of 40% nitric acid and 45% sulfuric acid in a mixing ratio of 3:1 for 24 hours. The reaction solution was washed with a large amount of tertiary distilled water until the pH of the reaction solution reached a neutral pH, and dried in a vacuum oven at 110° C. for 12 hours to synthesize oxidized activated carbon (Ox-PAC). In the second process, 2.5 g of Ox-PAC was added to a mixed solution of 400 mL of dichloromethane and 100 mL of thionyl chloride, and a reaction was allowed to occur therebetween at 35° C. for 24 hours. Subsequently, the solution was rotary evaporated using a rotary evaporator to obtain Thio-PAC from the synthesized compound. In the third process, 2.5 g of Thio-PAC was immediately reacted with 150 mL of melamine, 2.5 mL of dimethyl sulfoxide, and diisopropylethylamine (melamine was completely dissolved in the solution by ultrasonic injection in a bath). The mixed solution was allowed to react in a nitrogen gas at 120° C. for 24 hours. PAC particles were washed with dimethyl sulfoxide, tertiary distilled water, and ethanol (three times with each solution) through solid-liquid separation and dried in a vacuum oven at 110° C. for 12 hours to thereby synthesize Mel-PAC. In the last process, 500 mg of melamine and 800 mg of terephthalaldehyde were mixed with 150 mL of dimethyl sulfoxide, and COP was attached to the PAC particles and completely dissolved in a water bath through sonication to synthesize COP-PAC. Subsequently, 1,000 mg of Mel-PAC was mixed with the solution and allowed to react in a nitrogen gas atmosphere at 150° C. for 48 hours. The synthesized COP-PAC was separated from the solution and sufficiently washed sequentially with dimethyl sulfoxide, acetone, tertiary distilled water, and ethanol (three times with each solution). Thereafter, PAC was dried in a vacuum oven at 110° C. for 12 hours to thereby complete the synthesis of COP-PAC.

Example 8: PB Formation of COP Modified/Unmodified Powdered Activated Carbon

Figure 20:
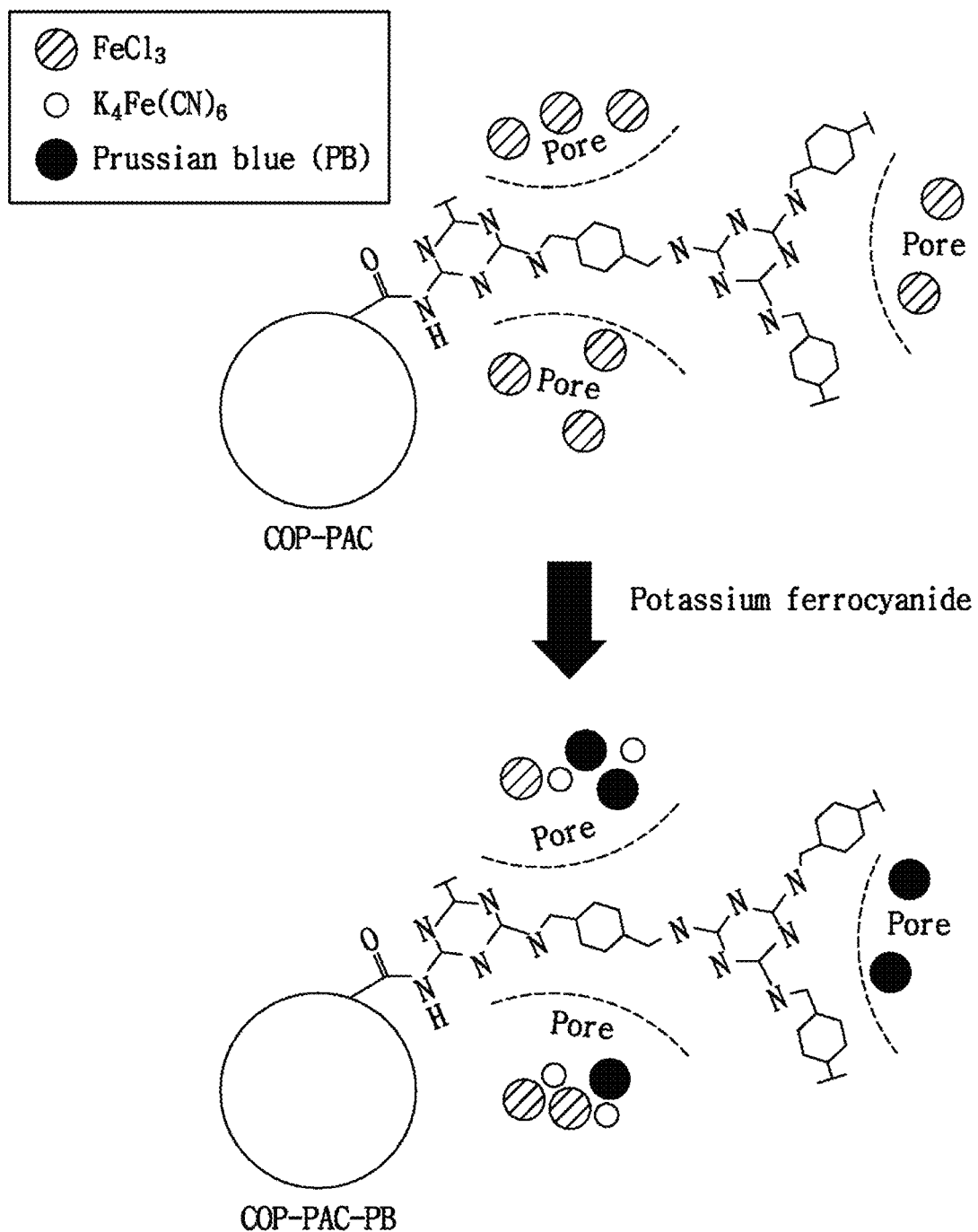
FIG. 20 is a view of a COP-PAC-PB synthesis (in-situ) process.

PB synthesis was performed using the in-situ method as illustrated in FIG. 20. First, 5 g of each of PAC, Ox-PAC and COP-PAC particles was allowed to react with 50 mL of iron (III) chloride ($FeCl_3$) and magnetically stirred at 100 rpm for 1 day. The mixed solution was subjected to solid-liquid separation using a centrifuge (at 4,000 rpm for 10 minutes). Subsequently, the separated solid was mixed with 50 mL of a 20 mM potassium ferrocyanide solution and a reaction was allowed to occur therebetween for 5 minutes. The mixed solution was again subjected to solid-liquid separation using a centrifuge (4,000 rpm for 10 minutes), and the separated solid was washed several times with tertiary distilled water, and then dried in a drying oven at 60° C. for 6 hours. To confirm whether PB is desorbed from the synthesized modified powdered activated carbon (COP-PAC) and the unmodified powdered activated carbon (PAC and Ox-PAC), the PB concentration of the wash water was measured using a UV-Vis spectrophotometer.

Experiment: Powdered Activated Carbon Support

Characterization of COP-PAC-PB Particles

A transmission electron microscope (JEOL, JEM-2010, Japan), which operates at 300 kV, was used to characterize the surfaces of PAC particles and COP-PAC particles, and an energy dispersive spectrometer (EDS) and an elemental analyzer (Thermo, Flash2000, Germany) were used to analyze the contents of elements constituting each adsorbent produced in each process. XRD analysis (Rigaku, SmartLab, Japan) and FT-IR analysis (Thermo, Nicolet iS50) of the samples were performed at room temperature, and the spectrum ranges were between 15 degrees and 75 degrees and between 500 $cm^{-1}$ and 3,000 $cm^{-1}$. The Brunauer-Emmett-Teller (BET) surface areas and average pore sizes of PAC, COP-PAC, and COP-PAC-PB were measured using a specific surface area and pore distribution analyzer (BEL, BELSORP-max, Japan). To confirm the desorption of PB synthesized in COP pores by the in-situ method, desorption properties were analyzed using the UV spectrum (BioChrom, Libara S22, USA).

Isothermal Adsorption Experiment of COP-PAC-PB

PB was immobilized in nanometer-sized pores of COP synthesized on the surface of PAC particles. All adsorption experiments were performed at room temperature using a polypropylene Falcon tube (15 mL). An undiluted solution (1000 $mgL^{-1}$) was prepared using CsCl and diluted for use in the experiments. COP-PAC-PB (0.01 g to 5 g) was added to 50 mL of a solution containing 10 $mgL^{-1}$ of Cs (ppm) and a reaction was allowed to occur therebetween for 24 hours, and then the Cs adsorption efficiency of COP-PAC-PB was analyzed by ICP-MS (Perkin-Elmer, Nexion 350D, USA). To measure the effect of COP-PAC-PB on removing radioactive cesium (Cs-137), 200 mL of distilled water containing 600 Bq of radioactive cesium was allowed to react with 0.1 g of COP-PAC-PB in a radiation detection tube for 24 hours. Radiation was measured using a radiation monitor (Nucare, RAD IQ FS200, Korea) equipped with a 3×3 inch NaI detector, a MCA, and a digital MCA in a 20 mm-thick lead lining storage container.

Experimental Results: Powdered Activated Carbon Support

1. Characterization of COP-PAC-PB Polymer

Figure 21:
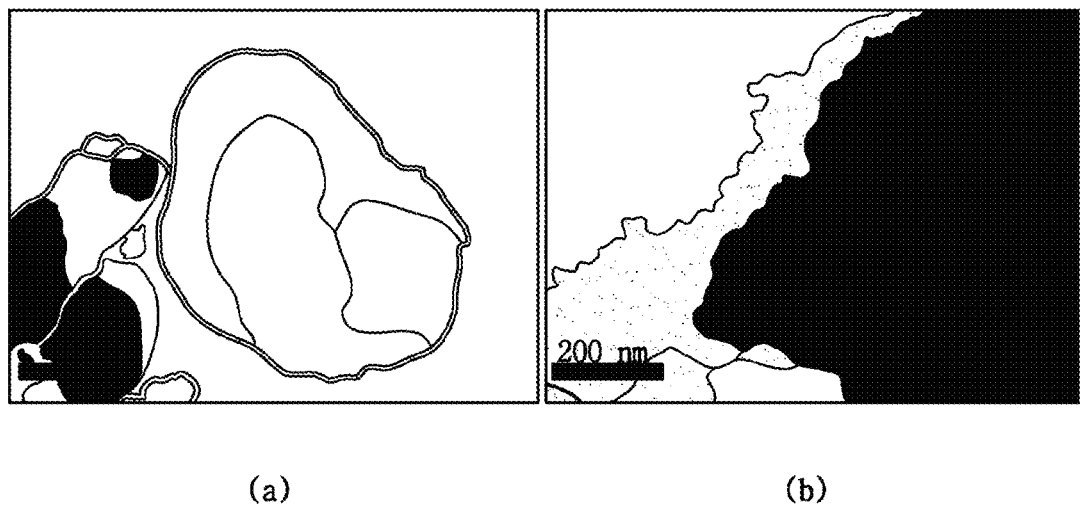
FIG. 21 illustrates TEM images of PAC (a) and COP-PAC (b)

First, powdered activated carbon (PAC) particles were allowed to react in a mixture of acids (a ratio of nitric acid to sulfuric acid of 3:1) for 24 hours to synthesize Ox-PAC. Once the carboxyl group was highly saturated at the surface of the PAC particles, the synthesized Ox-PAC was allowed to react in a ratio of 2:1 while refluxing in a mixed solution of dichloromethane ($CH_2Cl_2$) and thionyl chloride ($SOCl_2$), and the carboxyl group was converted into the acyl chloride substituent having high reactivity. The solvent used in the synthesized Thio-PAC particles was evaporated using a rotary evaporator, and the subsequent process was immediately performed to prevent acyl chloride from being hydrolyzed by air or moisture. Thio-PAC was allowed to react with a dimethyl sulfoxide solution in which melamine was completely dissolved to synthesize Mel-PAC. In this process, melamine formed an amide bond, which was then grafted onto the surface of activated carbon particles, the carboxyl group of which was converted into acyl chloride. Thus, shell-type COP was produced by the amine group of melamine. COP-PAC was synthesized through the growth of melamine due to terephthalaldehyde based on the Schiff-base network as in the previous studies. After synthesis, COP-PAC was washed to remove monomers and polymer that were not synthesized on the surface of PAC particles. FIG. 21 illustrates TEM images of PAC and COP-PAC. The TEM image analysis showed that the PAC particles had a smooth surface, whereas the shell-type COP was entangled in a chain form on the surface of COP-PAC particles. The shape of COP grafted on the surface of PAC particles was very similar to that of COP used in the previous studies for the synthesis of GAC particles [Mines, P. D. et al., Chemical Engineering Journal, 309, 766-771 (2017)].

Figure 22:
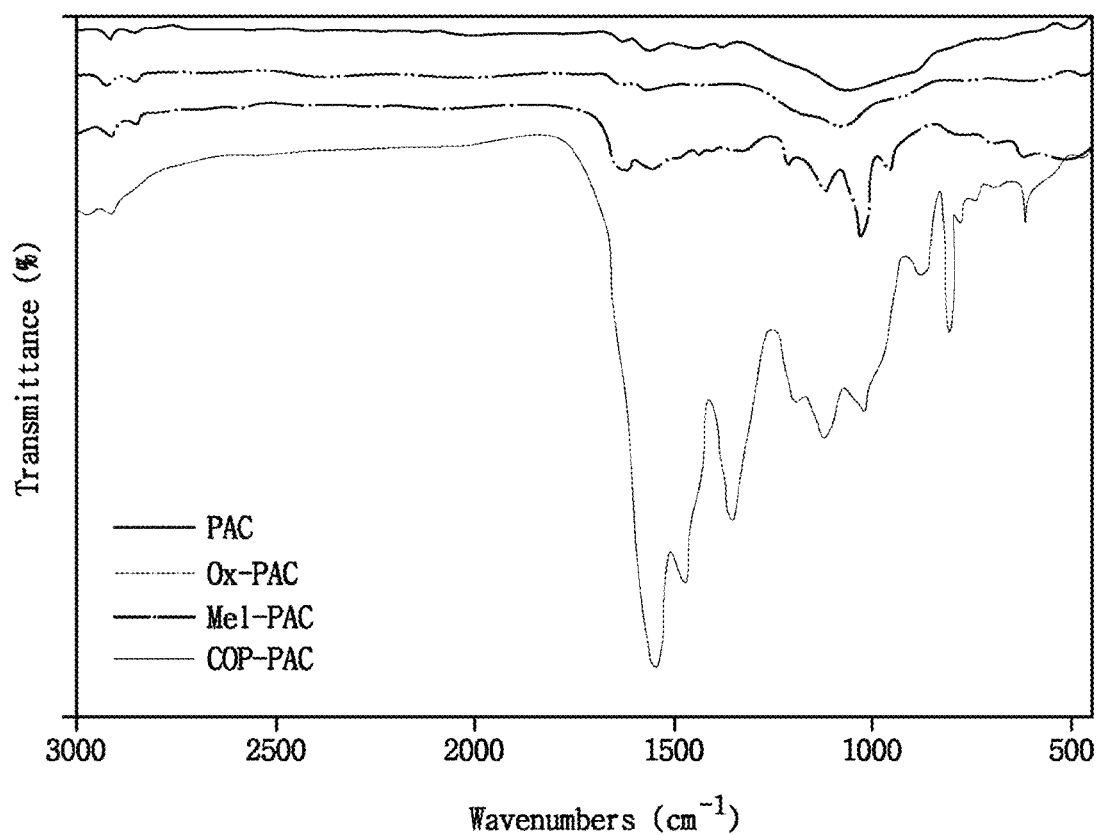
FIG. 22 illustrates FT-IR results of PAC, Ox-PAC, Mel-PAC, and COP-PAC.

The presence of COP was confirmed using EDS and elemental analysis (EA) techniques, and the results thereof are shown in Table 10. As a result, it was found that PAC is mainly composed of carbon, and the nitrogen content in COP-PAC was very high due to the presence of COP by the growth of melamine. Particle analysis also showed that carbon accounted for the majority of the PAC particle content, similar to the results of the EDS analysis. The oxygen content of Ox-PAC oxidized in the mixture of acids was significantly increased, but the hydrogen and nitrogen contents slightly increased. In the case of Mel-PAC, the nitrogen content was increased due to the grafted melamine which can be attributed to the addition of the amine group constituting melamine. The oxygen content was slightly reduced due to the melamine replacing acyl chloride. The nitrogen content in COP-PAC was highest compared to the other PAC types modified in the previous process, this is because the nitrogen content in COP-PAC was higher than that in Mel-PAC due to the growth of terephthalaldehyde and melamine. The results of analyzing the product in the COP synthesis process by FT-IR are the same as illustrated in FIG. 22. In the case of Ox-PAC, peaks corresponding to C=O and C—O were observed near 1,631 $cm^{-1}$ and 1,064 $cm^{-1}$, respectively, and the adsorption peaks corresponding to C—O were slightly stronger than those due to C=O. It was found that the Mel-PAC synthesized in the third process had a correlation with N—H and C—N near 1,630 $cm^{-1}$ and 1,209 $cm^{-1}$, respectively. For the finally modified COP-PAC, multiple peaks were observed at around 1,548, 1,479, 1,354, 1,193 and 877 $cm^{-1}$. The peak pattern was similar to that found in pure COP-19, indicating that COP was effectively grafted onto the surface of PAC particles.

TABLE 10

|  | C | N | O | H | Others |
|---|---|---|---|---|---|
| (a). TEM (EDS) (%) | | | | | |
| PAC | 90.71 | 0.93 | 3.78 | — | 4.58 |
| COP-PAC | 63.61 | 10.08 | 14.13 | — | 12.18 |
| (b). Elemental analysis (%) | | | | | |
| PAC | 80.14 | 0.27 | 3.06 | 0.58 | 15.92 |
| Ox-PAC | 45.60 | 1.12 | 16.32 | 4.59 | 30.98 |
| Mel-PAC | 76.64 | 2.48 | 8.95 | 0.78 | 12.49 |
| COP-PAC | 70.95 | 8.06 | 10.46 | 1.96 | 8.55 |

Figure 23:
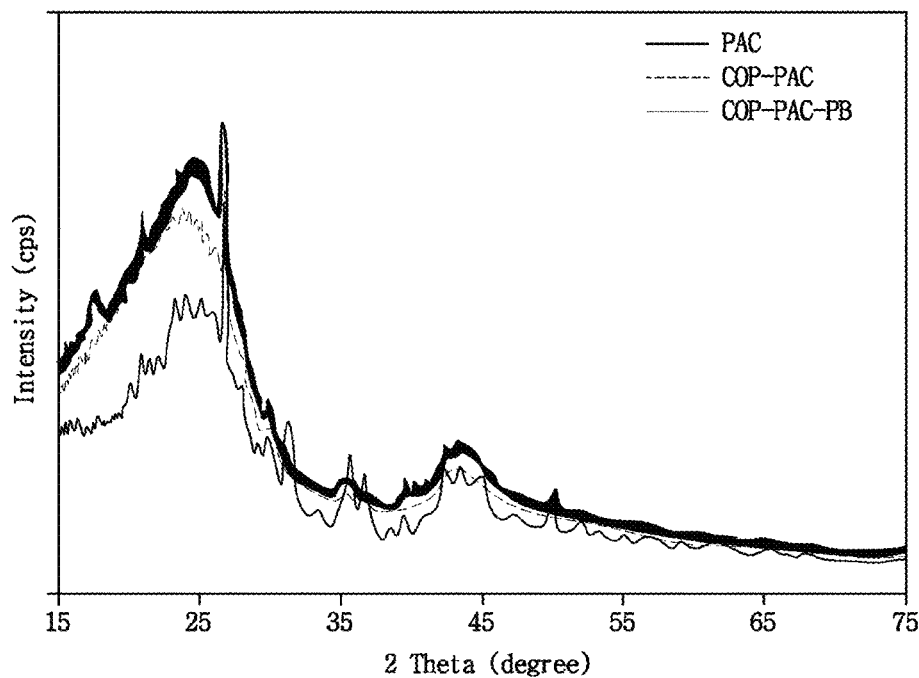
FIG. 23 illustrates XRD pattern results of PAC, COP-PAC, and COP-PAC-PB.
Figure 24:
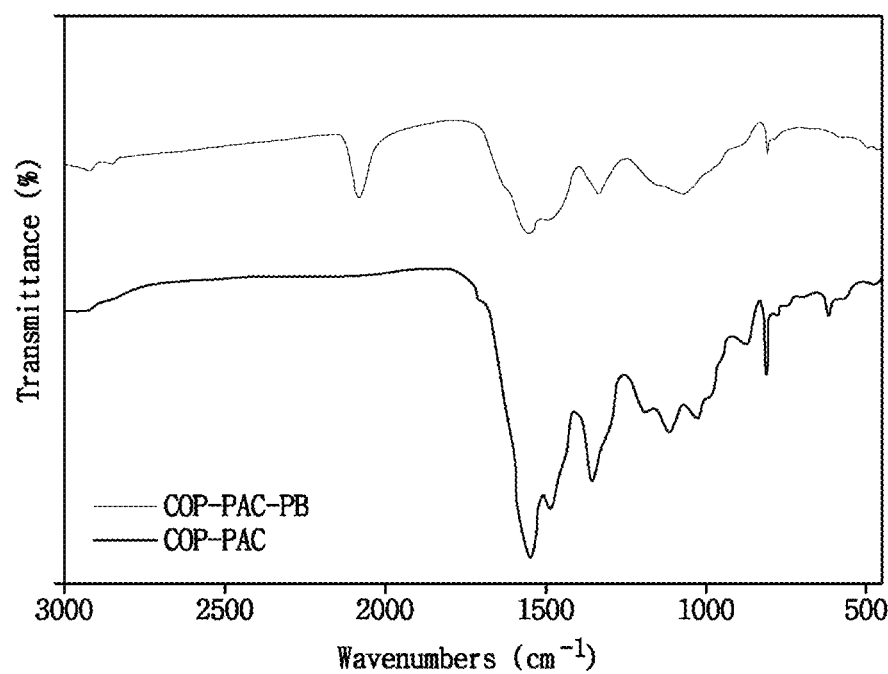
FIG. 24 illustrates FT-IR results of COP-PAC (red) and COP-PAC-PB (black)

As shown in FIG. 20, PB was synthesized in the pores of COP grafted onto the surface of COP-PAC particles. The results of XRD analysis of PAC, COP-PAC and COP-PAC-PB are shown in FIG. 23. Generally, peaks indicating PB characteristics are observed near 17.5 degrees and 39.7 degrees. The XRD of COP-PAC-PB was analyzed and the peaks of PB were compared with the peak patterns of PAC and COP-PAC indicated by black and red, respectively. As a result, the peak of PB was found at a position similar to that of the previous study results, confirming that PB was effectively synthesized in situ. FT-IR analysis was performed to confirm the presence of PB in the COP-PAC-PB particles, and a new adsorption peak due to (C≡N) stretching vibration of the cyanide group was observed at around 2,076 cm$^{-1}$, from which it was confirmed that PB was present in the COP-PAC-PB particles (see FIG. 24).

Figure 25:
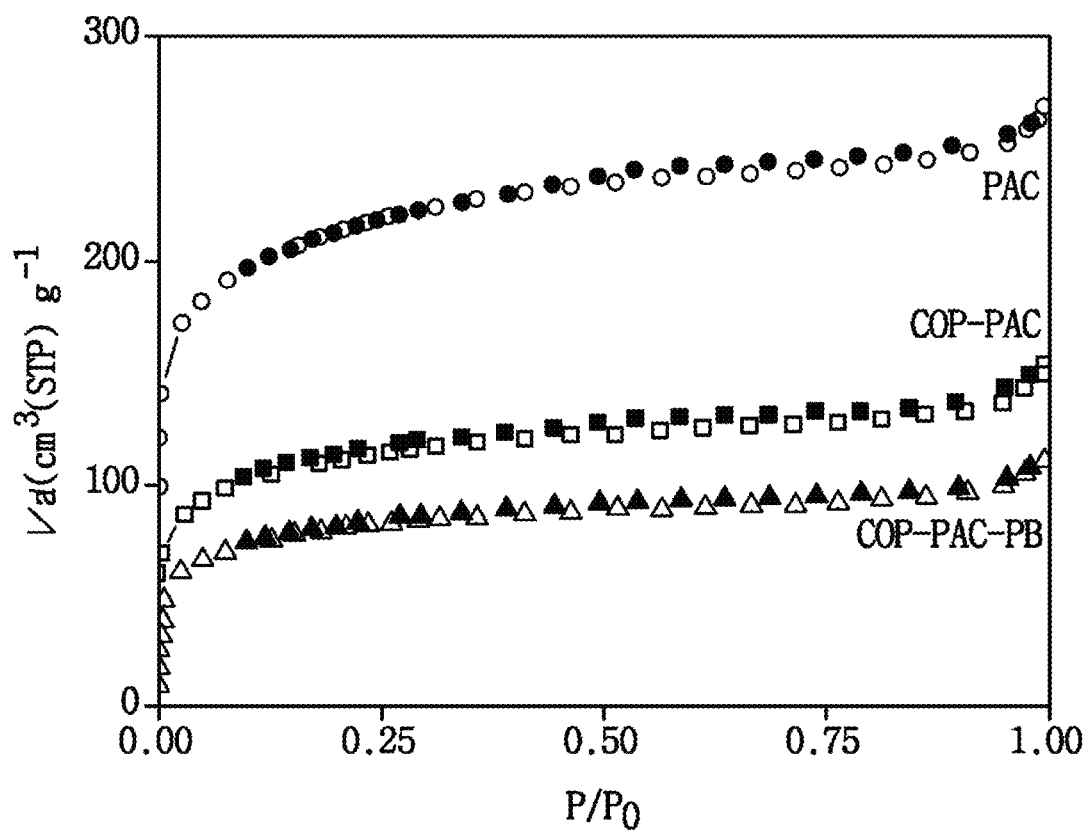
FIG. 25 illustrates results of analyzing Brunauer-Emmett-Teller (BET) surface areas of PAC (black), COP-PAC (red), and COP-PAC-PB (blue)

The results of analyzing the BET surface areas of PAC, COP-PAC and COP-PAC-PB using $N_2$ adsorption-desorption isotherms are shown in FIG. 25. The specific surface areas of PAC and COP-PAC were 776.82 m$^2$/g and 395 m$^2$/g, respectively. The specific surface area of a porous material is known to decrease significantly as it is oxidized during COP synthesis. This process increased the functional level for the oxidation of activated carbon particle surfaces, and these results were confirmed in the results of the TEM (EDS) and EA presented in Table 10. The specific surface area of COP-PAC was higher than that of Ox-PAC. This is because the specific surface area of COP-PAC increased as COP was synthesized on the surface of PAC through the grafting and growth of melamine. The results of the BET analysis in Table 11 indicate that the average pore size of COP-PAC and COP-PAC-PB is greater than the average pore size of PAC, this is because the walls of micropores were destroyed during the oxidation process. The BET surface area of COP-PAC-PB was 290 m$^2$/g, and this is because PB was synthesized in situ in the pores of COP present on the surface of PAC particles. Therefore, for this reason, it may be said that the specific surface area of COP-PAC-PB is smaller than that of COP-PAC.

TABLE 11

|  | BET surface area (m$^2$ g$^{-1}$) | Average pore size (nm) | Total pore volume (m$^3$ g$^{-1}$) |
|---|---|---|---|
| PAC | 776.82 | 2.1172 | 0.4112 |
| COP-PAC | 395.68 | 2.3651 | 0.2687 |
| COP-PAC-PB | 289.61 | 2.3299 | 0.2349 |

2. PB Elution Analysis of COP-PAC-PB

Figure 26:
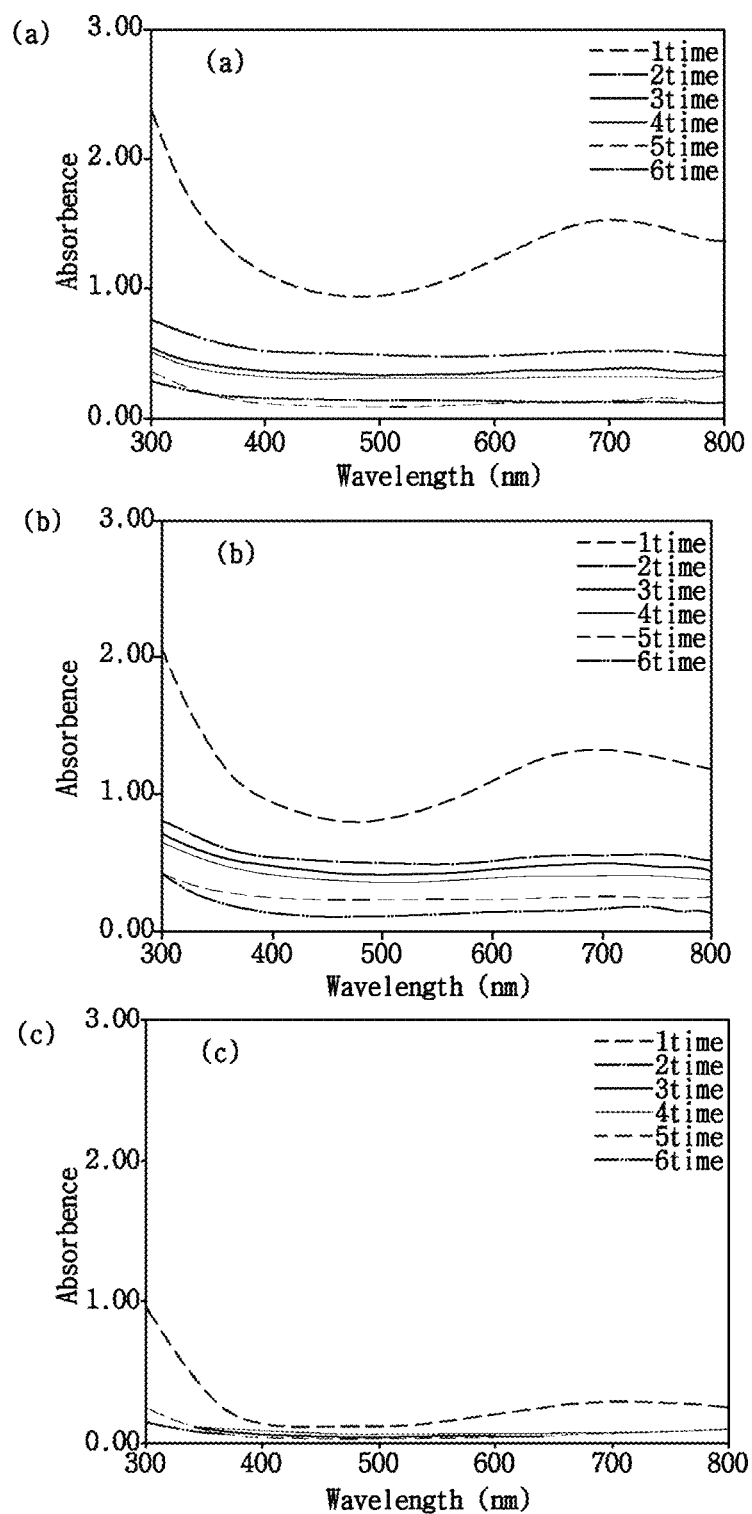
FIG. 26 illustrates Prussian blue desorption analysis when PAC-PB (a), Ox-PAC-PB (b), and COP-PAC-PB (c) were washed.

Immediately after in situ synthesis of PB using PAC, Ox-PAC, and COP-PAC, each adsorbent was washed six times and sampled. To analyze the desorption characteristics of PB, samples were subjected to UV-Vis analysis (see FIG. 26). As shown in FIG. 26, unmodified groups (PAC and Ox-PAC) showed a large amount of PB eluted upon the first one to two washes, and it was confirmed that a weak concentration of PB was continuously desorbed. In contrast, in the case of the modified group (COP-PAC), it was confirmed that a small amount of PB was desorbed upon the initial first wash. It was also confirmed that no PB was desorbed from COP-PAC after six washes, from which it was confirmed that PB was effectively bound to and immobilized in the pores of COP synthesized on the surface of the PAC particles. From these results, it was confirmed that COP-PAC-PB could prevent secondary environmental pollution by PB desorption when applied on-site.

3. Evaluation of Cesium Adsorption Performance of COP-PAC-PB

Ox-PAC was synthesized to modify the surface of PAC with COP and the surface of PAC particle was modified into COP-PAC using Ox-PAC and COP. The COP-PAC particles were then in situ reacted with an iron (III) chloride solution and a potassium ferrocyanide solution to bind PB thereto.

TABLE 12

| Items | PAC-PB | Ox-PAC-PB | COP-PAC-PB |
|---|---|---|---|
| Initial Cs (mg L−1) | 9.91 | 9.91 | 9.91 |
| Final Cs (mg L−1) | 7.82 | 7.45 | 1.32 |
| Removal rate (%) | 20 | 24.8 | 86.7 |

Figure 27:
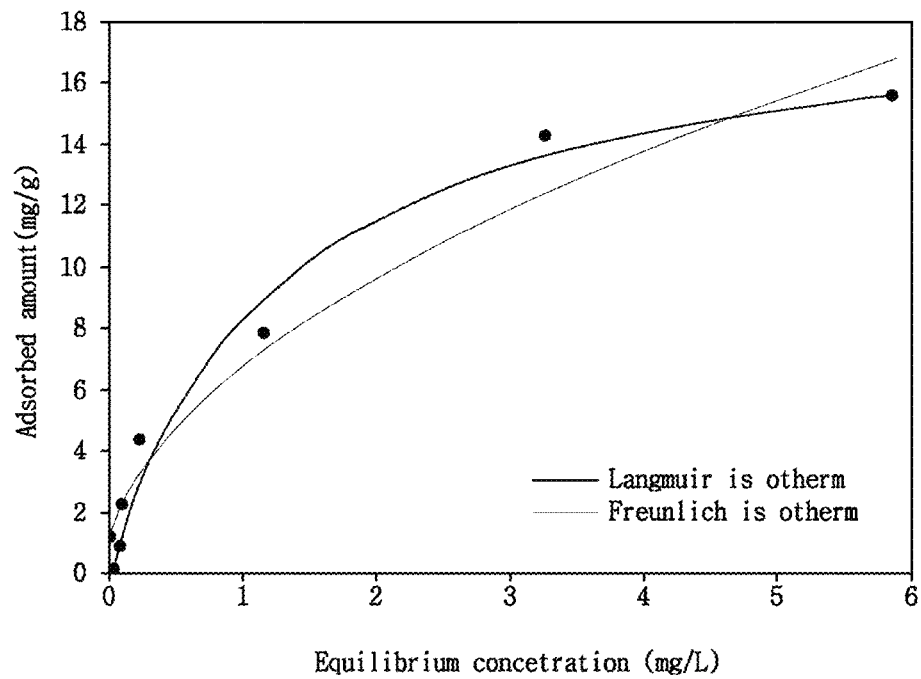
FIG. 27 illustrates adsorption-desorption isotherms of COP-PAC-PB particles.

As shown in Table 12, PAC-PB and Ox-PAC-PB showed removal efficiencies of 20% and 25%, respectively, in a 9.91 mgL$^{-1}$ (initial concentration) cesium solution, but COP-PAC-PB exhibited a removal efficiency of about 86%. These results indicate that COP was effectively synthesized on the surface of PAC particles and PB was successfully synthesized in situ within COP pores. The adsorption-desorption isotherm of COP-PAC-PB particles is the same as illustrated in FIG. 27. The maximum adsorption amount of COP-PAC-PB particles was 19 mg/g, and the equilibrium data was fitted to the Langmuir and Freundlich isotherm models. For the Langmuir isothermal adsorption model, it was assumed that adsorption takes place at uniform specific sites due to uniform adsorption energy, and the equation is as follows:

$$\frac{1}{q_e} = \frac{1}{bC_e q_m} + \frac{1}{q_m}\frac{1}{q_e} = \frac{1}{bC_e q_m} + \frac{1}{q_m} \tag{1}$$

wherein, in Equation 1, Ce (mgL$^{-1}$) denotes an equilibrium concentration, $q_m$ (mgL$^{-1}$) denotes the maximum adsorption capacity of a single layer, and b is a Langmuir constant. The adsorption capacity of the single layer ($q_m$) and the Langmuir constant (b) are obtained from the intercept and slope thereof, respectively. For the Freundlich isothermal adsorption model, it was assumed that the surface of the adsorbent has different adsorption energies. In the Freundlich isothermal adsorption model, $K_f$ is an index indicating adsorption capacity and n is a constant indicating adsorption strength.

$$q_e = k_f C_e^{1/n} q_e = k_f C_e^{1/n} \tag{2}$$

The constants of the Langmuir and Freundlich models for COP-PAC-PB are shown in Table 13. The correlation coefficients ($R^2$) of the Langmuir isothermal adsorption model and the Freundlich isothermal adsorption model are 0.9844 and 0.9635, respectively, wherein the $R^2$ value is higher in the Langmuir isothermal adsorption model than in the Freundlich isothermal adsorption model. From these results, it was confirmed that cesium was uniformly adsorbed as a single layer in pores.

TABLE 13

Adsorption constants of Langmuir isothermal adsorption model and Freundlich isothermal adsorption model

| Langmuir isotherm | | | Freundlich isotherm | | |
|---|---|---|---|---|---|
| $q_m q_n$ (mg/g) | bb (L/mg) | $R^1$ | $k_f K_p$ (mg$^{1-1/n}$L$^{1/n}$/g) | 1/n | $R^2$ |
| 19 | 0.7704 | 0.9844 | 6.8212 | 6.8212 | 0.9635 |

Figure 28:
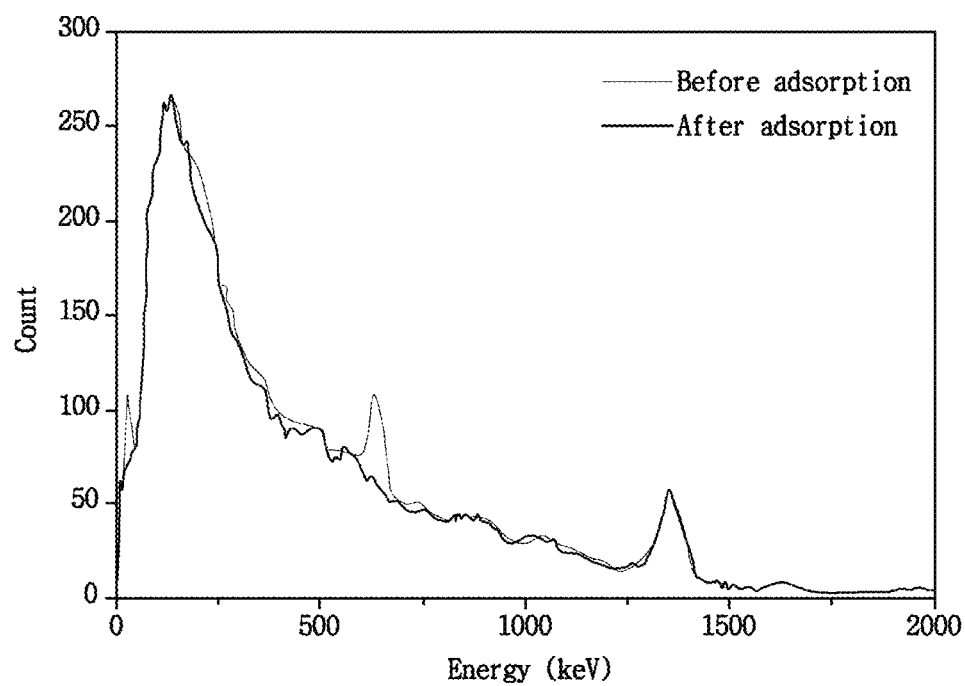
FIG. 28 illustrates emission level spectra before/after adsorption experiments.

The adsorption experiments were carried out to determine the Cs-137 removal ability of COP-PAC-PB, and the results thereof are shown in Table 14. COP-PAC-PB (0.2 g) was added to a 200 ml solution containing 60 Bq/kg of Cs-137 and a reaction was allowed to occur therebetween for 24 hours. The Cs-137 concentration of the solution was then measured for 3,600 seconds using a 3×3 inch NaI detector (Nucare, RAD IQ FS200, Korea) capable of analyzing nuclear species in a 20 mm-thick lead storage container. The final Cs-137 concentration was 1.62 Bq/kg, which was a 97.3% reduction of the initial concentration. In addition, the emission level in the solution before and after the adsorption experiment was shown by spectra (see FIG. 28). The levels before and after adsorption are indicated by red and black, respectively, and the detector was used under the same conditions. Before and after the adsorption experiment, the energy level of K-40 gamma rays, which is a natural radioactive species, showed a clear peak (1,460 KeV). The energy level (indicated by red) of the Cs-137 gamma-ray before adsorption showed a clear peak (662 keV), but the peak (662 KeV) was not clearly observed in the spectrum after adsorption due to the decreased Cs-137 concentration. From which, it was confirmed that Cs-137 was efficiently adsorbed and removed by the added COP-PAC-PB.

TABLE 14

| Cs-137 removal capacity of COP-PAC-PB | | | | |
|---|---|---|---|---|
| | Cs-137 act vity (Bq/kg) | | Performance | |
| COP-PAC-PB (gL$^{-1}$) | Initial | Final | R (%) | DL |
| 0.5 | 623.05 | 2.35 | 99.62 | 5.73 |

As is apparent from the foregoing description, a cesium adsorbent according to the present disclosure not only exhibits excellent binding performance for a support through in-situ synthesis of Prussian blue in the presence of the support, but is also captured in pores formed on the support, thus exhibiting excellent physical stability, instead of physically attaching the previously synthesized Prussian blue to a support.

Accordingly, the cesium adsorbent can enhance the durability and stability of Prussian blue, which is an effective component for absorbing radioactive cesium.

In addition, when the cesium adsorbent is prepared, a simple solution process is used, and thus manufacturing efficiency of the cesium adsorbent is very high and mass-production thereof can be facilitated.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various changes in form and details may be made therein without departing from the spirit and scope as defined by the following claims.

What is claimed is:

1. A method of preparing a cesium adsorbent, the method comprising:
   forming a carboxyl group on a surface of a support; and
   directly synthesizing Prussian blue on the surface of the support with the carboxyl group formed thereon,
   wherein a polymer having a hydroxyl group is used as the support, and the method comprises:
   modifying a surface of the polymer to have the carboxyl group thereon by treating the polymer with acrylic acid;
   adding a sodium chloride (NaCl) solution to the polymer to allow a reaction to occur therebetween;
   adding an iron chloride (FeCl$_3$) solution to the polymer to allow a reaction to occur therebetween;
   adding a potassium ferrocyanide (K$_4$Fe(CN)$_6$) solution to the polymer to allow a reaction to occur therebetween; and
   further adding the iron chloride (FeCl$_3$) solution to the polymer.

* * * * *